(12) United States Patent
Nozoe et al.

(10) Patent No.: US 9,217,814 B2
(45) Date of Patent: Dec. 22, 2015

(54) CELLULOSE ACYLATE FILM, A POLARIZING PLATE USING THE SAME AND A LIQUID CRYSTAL DISPLAY USING THE SAME

(71) Applicant: FUJIFILM Corporation, Tokyo (JP)

(72) Inventors: Yutaka Nozoe, Kanagawa (JP); Yu Naito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/031,928

(22) Filed: Sep. 19, 2013

(65) Prior Publication Data

US 2014/0085575 A1    Mar. 27, 2014

(30) Foreign Application Priority Data

Sep. 24, 2012  (JP) .................................. 2012-210215
Sep. 24, 2012  (JP) .................................. 2012-210216

(51) Int. Cl.
*C09K 19/00* (2006.01)
*G02B 1/10* (2015.01)
(Continued)

(52) U.S. Cl.
CPC .............. *G02B 1/105* (2013.01); *G02B 5/3033* (2013.01); *G02F 1/133528* (2013.01); *Y10T 428/10* (2015.01); *Y10T 428/105* (2015.01); *Y10T 428/31504* (2015.04)

(58) Field of Classification Search
CPC ....... G02F 1/133528; C08L 1/08; C08L 1/10; C08L 1/12; C08L 1/14; C08J 2301/08; C08J 2301/10; C08J 2301/12; C08J 2301/14; C08J 5/18; G02B 1/04; G02B 5/30; G02B 5/3033; Y10T 428/10; Y10T 428/1036; Y10T 428/1041; Y10T 428/105
USPC ............ 428/1.1, 1.3, 1.31, 1.33; 349/96, 158; 106/162.7; 524/37, 38, 39, 41
See application file for complete search history.

(56) References Cited

U.S. PATENT DOCUMENTS

2009/0306361 A1* 12/2009 Kawabe et al. ................. 536/63
2013/0189449 A1*  7/2013 Fukagawa et al. ........... 428/1.33

FOREIGN PATENT DOCUMENTS

GB    1313538       4/1973
JP    58-121230     7/1983
(Continued)

OTHER PUBLICATIONS

Vinogradov et al., Plasticheskiye Massy, 9, 1977, p. 2-3, English translation.*

(Continued)

*Primary Examiner* — Ruiyun Zhang
(74) *Attorney, Agent, or Firm* — Jean C. Edwards, Esq.; Edwards Neils PLLC

(57) ABSTRACT

A cellulose acylate film containing at least one compound represented by the following Formula (I) or (II), and cellulose acylate, a polarizing plate using the same and a liquid crystal display device using the same, wherein in Formula (I), $R^1$ represents an alkyl group; $R^2$ and $R^3$ each represent a hydrogen atom, an alkyl or an aryl group; $R^4$ represents an alkyl group; $Ar^1$ represents an aromatic group; m and n are integers; provided that when n is 1, $Ar^1$ represents an aromatic group; and in Formula (II), $R^{11}$ to $R^{14}$ each represent a hydrogen atom, or an alkyl group; $R^{11}$ and $R^{12}$, and/or, $R^{13}$ and $R^{14}$ may form a ring; $R^{15}$ and $R^{17}$ each represent an alkyl group; and $R^{16}$ and $R^{18}$ each represent a hydrogen atom or alkyl group; Ar represents an arylene group; and l, m1 and n1 are integers.

Formula (I)

Formula (II)

18 Claims, 1 Drawing Sheet

(51) Int. Cl.
*G02B 5/30* (2006.01)
*G02F 1/1335* (2006.01)

(56) References Cited

FOREIGN PATENT DOCUMENTS

| JP | 63-303939 | 12/1988 |
| JP | 11-246457 | 9/1999 |
| JP | 11-335312 | 12/1999 |
| JP | 2006-241428 A | 9/2006 |
| JP | 2010-112987 | 5/2010 |
| JP | 2012-144627 | 8/2012 |
| JP | 2013-151618 | 8/2013 |
| JP | 2014-059547 | 4/2014 |
| JP | 2014-059548 | 4/2014 |
| WO | WO-2012-014571 | 2/2012 |
| WO | WO-2013-047845 | 4/2013 |

OTHER PUBLICATIONS

Notice of Reasons for Rejection issued by JPO on Jul. 22, 2014 in connection with corresponding Japanese Patent Application No. 2012-210216.

Notice of Reasons for Rejection issued by JPO on Sep. 24, 2014 in connection with corresponding Japanese Patent Application No. 2012-210215.

Plasticheskie Massy, 1977, (9), p. 26-27.

* cited by examiner

CELLULOSE ACYLATE FILM, A POLARIZING PLATE USING THE SAME AND A LIQUID CRYSTAL DISPLAY USING THE SAME

CROSS-REFERENCE TO RELATED APPLICATIONS

The present application claims priority from Japanese Patent Application Nos. 2012-210215, filed Sep. 24, 2012, and 2012-210216, filed Sep. 24, 2012, the contents of all of which are herein incorporated by reference in their entirety.

FIELD OF THE INVENTION

The present invention relates to a cellulose acylate film, a polarizing plate using the same and a liquid crystal display using the same.

BACKGROUND OF THE INVENTION

The cellulose acylate film is used for various liquid crystal display as an optical element thereof such as a support for an optical compensation film and a protective film for a polarizing plate.

In addition to an indoor use of the liquid crystal display such as a TV use and the like, a chance of the outdoor use thereof, for example, use as a mobile device and the like, are increased. As a result, development of a liquid crystal display impervious to the use under the conditions of higher temperature and higher humidity than ever before is required.

Further, a demand for the liquid crystal display to be impervious to more various uses even under unforgiving conditions is growing, and durability at a higher level than ever before has been required from year to year.

In order to suppress generation of yellowing (increase in yellowness index) when a cellulose acylate film is produced by means of film formation using melting state, incorporation of a particular phenol derivative as an antioxidant or a degradation-preventing agent into the cellulose acylate film is proposed (see Patent Literature 1).

CITATION LIST

Patent Literatures

Patent Literature 1: JP-A-2006-241428 ("JP-A" means unexamined published Japanese patent application)

SUMMARY OF THE INVENTION

The present invention resides in a cellulose acylate film containing at least one compound represented by the following formula (I) or (II), and cellulose acylate:

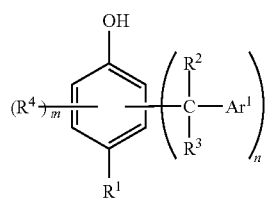

Formula (I)

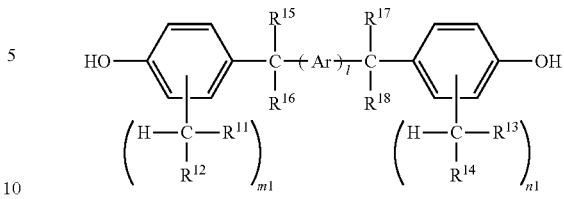

Formula (II)

wherein in formula (I), $R^1$ represents an unsubstituted straight chain, branched or cyclic alkyl group having 1 to 12 carbon atoms, $R^2$ and $R^3$ each independently represent a hydrogen atom, an alkyl group having 1 to 6 carbon atoms, or an aryl group; $R^4$ represents an unsubstituted alkyl group having 1 to 6 carbon atoms; $Ar^1$ represents a substituted or unsubstituted aromatic group; m represents an integer of 0 to 3; and n represents an integer of 1 to 4; provided that when n is 1, $Ar^1$ represents an unsubstituted aromatic group; and in formula (II) $R^{11}$ to $R^{14}$ each independently represent a hydrogen atom or an alkyl group having 1 to 8 carbon atoms; $R^{11}$ and $R^{12}$, and/or, $R^{13}$ and $R^{14}$ may bond to one another to form a ring; $R^{15}$ and $R^{17}$ each independently represent an unsubstituted alkyl group having 1 to 8 carbon atoms; and $R^{16}$ and $R^{18}$ each independently represent a hydrogen atom, or an unsubstituted alkyl group having 1 to 8 carbon atoms; Ar represents a substituted or unsubstituted arylene group having 6 to 18 carbon atoms, l, m1 and n1 independently represent an integer of to 1 to 4.

Other and further features and advantages of the invention will appear more fully from the following description, appropriately referring to the accompanying drawings.

BRIEF DESCRIPTION OF THE DRAWING

FIG. 1 is an example diagrammatically showing an internal structure of the liquid crystal display.

FIG. 2 is a schematic view showing an example in which casting of the cellulose acylate film having a three-layer structure is carried out by a simultaneous co-casting using a co-casting die.

DETAILED DESCRIPTION OF THE INVENTION

Figure 1:
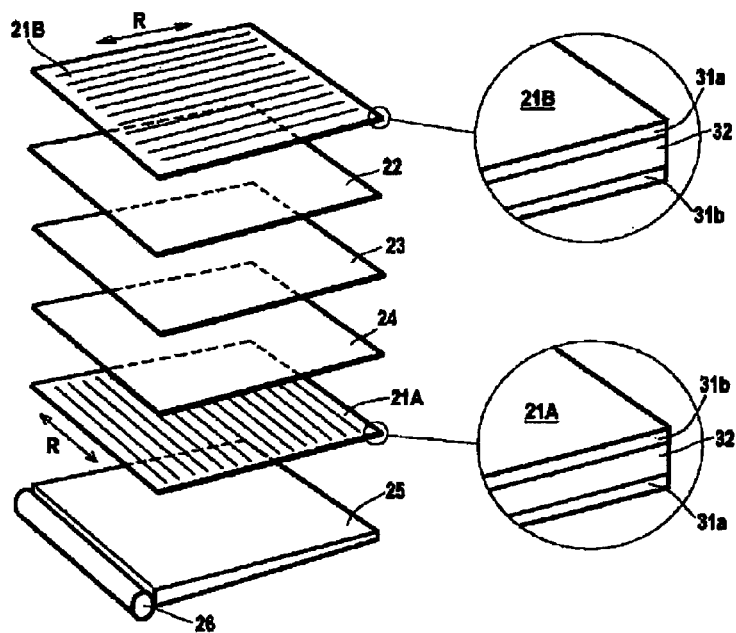
{FIG. 1}

In view of the above situation, the present invention has been made with the aim of developing a liquid crystal display that is impervious to the use under the unforgiving conditions of high temperature and high humidity and the like, and a cellulose acylate film that is used for the liquid crystal display.

The use of the liquid crystal display under the conditions of high temperature and high humidity causes a problem that display performances are degraded due to generation of unevenness resulting from shrinkage of the polarizer, or due to change of optical properties. Further, prevention of yellowing during film formation using melting state and improvement in durability during using the liquid crystal display under the conditions of high temperature and high humidity are different mechanisms one another including acting factors. It is difficult to apply the findings in the film formation using melting state directly to film formation with solution. There is no previous knowledge capable of realizing improvement in polarizer durability at stages where the polarizer is mounted and used in the liquid crystal display (especially under the conditions of high temperature and high humidity, or at the time of light irradiation). Thus, development of a new solution has been required.

According to a study conducted by the present inventors based on a previous knowledge, there is a technical difficulty in compatibility between improvement in polarizer durability and reduction in coloring such as yellowing of the cellulose acylate film.

In view of the above situation, the present invention has been made with the aim of solving the above-described problem relating to the technical difficulty, and thus, the present invention is contemplated for providing a cellulose acylate film, in which polarizer durability is improved, generation of display unevenness is suppressed, coloring of the film due to a long time aging with heat or heat and light is suppressed, and a haze is suppressed, and in addition, capable of reducing contamination caused in the processes during production. Moreover, the present invention is contemplated for providing a high-durability polarizing plate and liquid crystal display, each of which uses the above-described cellulose acylate film.

As a result of studies from various viewpoints including radical stability and reactivity of various phenol-based compounds, the present inventors have understood that even though hindered phenols having a ballast substituent such as a tertiary alkyl group at the ortho position with respect to the phenolic hydroxyl group of the hindered phenol is incorporated in a cellulose acylate film, this is insufficient for solving the above-described problem. As a result of investigation into this cause, the present inventors have found that it is important to leave a reactivity of the phenolic hydroxyl group rather than the radical stability in the case where the phenolic hydroxyl group has become a radical, that is, adjustment between the radical stability and the reactivity is important.

On the other hand, a compound having a highly-reactive phenolic hydroxyl group may decompose due to oxidation reaction and the like upon application of energy such as heat and light, and may cause coloring of the film or the like. This causes a big problem in practice.

For compatibility between improvement in polarizer light resistance and suppression of film coloring when improving polarizer durability, the present inventors have conducted additional studies based on the above-described findings, and as a result the present invention has been completed.

According to the present invention, there is provided the following means:

(1) A cellulose acylate film containing at least one compound represented by the following Formula (I) or (II), and cellulose acylate:

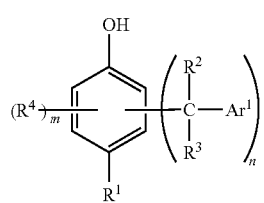

Formula (I)

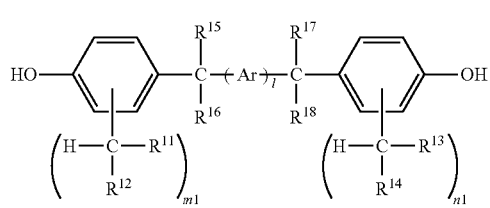

Formula (II)

wherein in Formula (I), $R^1$ represents an unsubstituted straight chain, branched or cyclic alkyl group having 1 to 12 carbon atoms; $R^2$ and $R^3$ each independently represent a hydrogen atom, an alkyl group having 1 to 6 carbon atoms, or an aryl group; $R^4$ represents an unsubstituted alkyl group having 1 to 6 carbon atoms; $Ar^1$ represents a substituted or unsubstituted aromatic group; m represents an integer of 0 to 3; and n represents an integer of 1 to 4; provided that when n is 1, $Ar^1$ represents an unsubstituted aromatic group; and in Formula (II), $R^{11}$ to $R^{14}$ each independently represent a hydrogen atom, or an alkyl group having 1 to 8 carbon atoms; $R^{11}$ and $R^{12}$, and/or, $R^{13}$ and $R^{14}$ may bond to one another to form a ring; $R^{15}$ and $R^{17}$ each independently represent an unsubstituted alkyl group having 1 to 8 carbon atoms; and $R^{16}$ and $R^{18}$ each independently represent a hydrogen atom, or an unsubstituted alkyl group having 1 to 8 carbon atoms; Ar represents a substituted or unsubstituted arylene group having 6 to 18 carbon atoms; l, m1 and n1 independently represent an integer of 1 to 4.

(2) The cellulose acylate film according to (1), wherein the compound represented by the Formula (I) or (II) is a compound represented by the Formula (I).

(3) The cellulose acylate film according to (1) or (2), wherein the compound represented by the Formula (I) is a compound represented by the following Formula (IA):

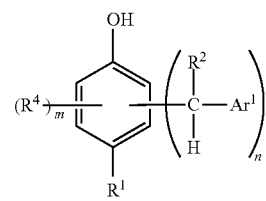

Formula (IA)

wherein in Formula (IA), $R^1$, $R^2$, $R^4Ar^1$, m and n are the same meanings as those of $R^1$, $R^2$, $R^4Ar^1$, m and n in the Formula (I), respectively.

(4) The cellulose acylate film according to (3), wherein the compound represented by the Formula (IA) is a compound represented by the following Formula (IB):

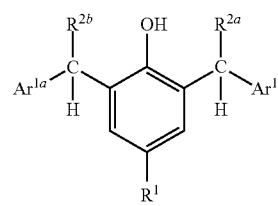

Formula (IB)

wherein in Formula (IB), $R^1$ and $Ar^1$ are the same meanings as those of $R^1$ and $Ar^1$ in the Formula (I), respectively; $R^{2a}$ and $R^{2b}$ each independently represent a hydrogen atom or an alkyl group having 1 to 6 carbon atoms; $Ar^{1a}$ is the same meaning as that of $Ar^1$ in the Formula (I).

(5) The cellulose acylate film according to (4), wherein the compound represented by the Formula (IB) is a compound represented by the following Formula (IC):

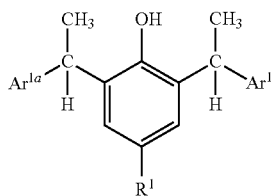

Formula (IC)

wherein in Formula (IC), $R^1$ and $Ar^1$ are the same meanings as those of $R^1$ and $Ar^1$ in the Formula (I), respectively; $Ar^{1a}$ is the same meaning as that of $Ar^1$ in the Formula (I).

(6) The cellulose acylate film according to any one of (1) to (5), wherein the $R^1$ represents an unsubstituted straight chain, branched or cyclic alkyl group having 1 to 8 carbon atoms.

(7) The cellulose acylate film according to any one of (1) to (6), wherein the $R^1$ is a methyl group or a tert-butyl group.

(8) The cellulose acylate film according to (1), wherein the compound represented by the Formula (I) or (II) is a compound represented by the Formula (II).

(9) The cellulose acylate film according to (1) or (8), wherein the $R^{16}$ and $R^{18}$ each independently represent a hydrogen atom, or an unsubstituted alkyl group having 1 to 8 carbon atoms.

(10) The cellulose acylate film according to (1), (8) or (9), wherein the compound represented by the Formula (II) is a compound represented by the following Formula (IA):

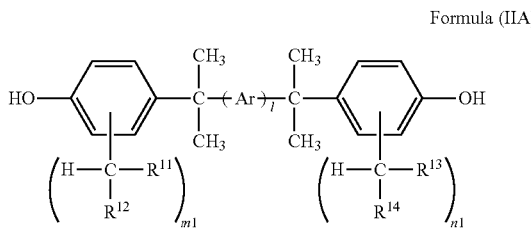

Formula (IIA)

wherein in Formula (IIA), $R^{11}$ to $R^{14}$, Ar, l, m1 and n1 are the same meanings as those of $R^{11}$ to $R^{14}$, Ar, l, m1 and n1 in the Formula (II), respectively.

(11) The cellulose acylate film according to (10), wherein the compound represented by the Formula (IIA) is a compound represented by the following Formula (IIB):

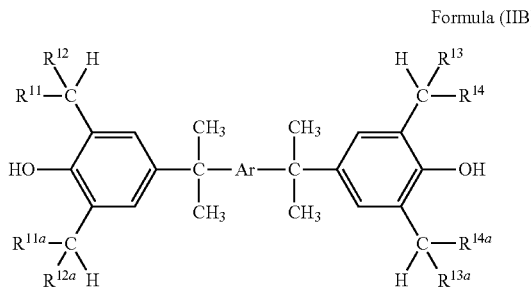

Formula (IIB)

wherein in Formula (IIB), $R^{11}$ to $R^{14}$ and Ar are the same meanings as those of $R^{11}$ to $R^{14}$ and Ar in the Formula (II), respectively; $R^{11a}$ to $R^{14a}$ are the same meanings as those of the $R^{11}$ to $R^{14}$, respectively.

(12) The cellulose acylate film according to (II), wherein the $R^{11}$ and $R^{12}$ simultaneously represent a hydrogen atom or simultaneously represent an alkyl group having 1 to 6 carbon atoms; the $R^{13}$ and $R^{14}$ simultaneously represent a hydrogen atom or simultaneously represent an alkyl group having 1 to 6 carbon atoms; the $R^{11a}$ and $R^{12a}$ simultaneously represent a hydrogen atom or simultaneously represent an alkyl group having 1 to 6 carbon atoms; and the $R^{13a}$ and $R^{4a}$ simultaneously represent a hydrogen atom or simultaneously represent an alkyl group having 1 to 6 carbon atoms.

(13) The cellulose acylate film according to (11) or (12), wherein the compound represented by the Formula (IIB) is a compound represented by the following Formula (IIC):

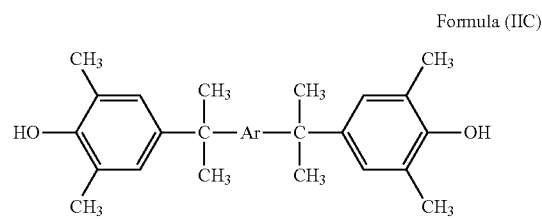

Formula (IIC)

wherein in Formula (IIC), Ar is the same meaning as that of Ar in the Formula (II).

(14) The cellulose acylate film according to any one of (1) to (13), wherein the acyl substitution degree (A) of the cellulose acylate satisfies the following formula.

1.5≤A≤3.0

(15) The cellulose acylate film according to any one of (1) to (14), wherein an acyl group of the cellulose acylate is an acetyl group, and the acetyl substitution degree (B) of the cellulose acylate satisfies the following formula.

2.0≤B≤3.0

(16) The cellulose acylate film according to any one of (1) to (15), further containing at least one polycondensation ester compound.

(17) The cellulose acylate film according to (16), wherein the polycondensation ester compound is obtained by polycondensation of at least one dicarboxylic acid represented by the following Formula (a) and at least one diol represented by the following Formula (b):

HOC(=O)—X—CO$_2$H    Formula (a)

HO—Z—OH    Formula (b)

in Formulae (a) and (b), X represents a divalent aliphatic group having 2 to 18 carbon atoms or a divalent aromatic group having 6 to 18 carbon atoms, and Z represents a divalent aliphatic group having 2 to 8 carbon atoms.

(18) The cellulose acylate film according to (16) or (17), wherein the number-average molecular weight of the polycondensation ester compound is from 500 to 2000.

(19) The cellulose acylate film according to any one of (16) to (18), wherein the terminal of the polycondensation ester compound is sealed.

(20) The cellulose acylate film according to any one of (1) to (19), further containing at least one compound selected from a monosaccharide and a carbohydrate compound composed of from 2 to 10 monosaccharide units.

(21) The cellulose acylate film according to (20), wherein the carbohydrate compound has an alkyl group, an aryl group or an acyl group.

(22) The cellulose acylate film according to (20) or (21), wherein the carbohydrate compound has an acyl group.

(23) A polarizing plate containing at least the cellulose acylate film according to any one of (1) to (22) and a polarizer.

(24) A liquid crystal display containing at least the polarizing plate according to (23) and a liquid crystal cell.

In the above, (1), (2) to (7), (14) to (23) may be referred to as a first embodiment of the present invention, while (1), (8) to (23) may be referred to as a second embodiment of the present invention.

The present invention enables to provide a cellulose acylate film in which polarizer durability is improved, haze is low, generation of display unevenness is suppressed, and coloration of the film due to aging with heat and light is drastically reduced, and in addition, contamination caused in the processes during production can be reduced. Further, the present invention enables to provide a polarizing plate and a liquid crystal display, each of which uses the cellulose acylate film.

Particularly, in the first embodiment of the present invention, the drastic reduction in the coloration of the film is effective for coloration due to a long time aging with heat. While, on the other hand, it is effective for coloration due to a long time aging with heat and light in the second embodiment of the present invention.

Hereinafter, the present invention is described in detail referring to the embodiments.

Note that, in this patent specification, any numerical expressions in a style of "... to ..." will be used to indicate a range including the lower and upper limits represented by the numerals given before and after "to", respectively.

Further, in the present specification, the "group" which is explained in each group is a substituted or unsubstituted group, and for example, the "alkyl group" means an alkyl group that may have a substituent. Further, the "aliphatic group" is a straight chain, branched, or cyclic aliphatic group, and it may be saturated or unsaturated (it never constitutes an aromatic ring), and it may have a substituent.

<<Cellulose Acylate Film>>

The cellulose acylate film of the present invention contains a compound represented by the following Formula (I) or (II) (hereinafter, also referred to as the compound of the present invention), and cellulose acylate.

The above cellulose acylate film improves polarizing plate durability, thereby suppressing degradation of the polarizing plate. Hence, the above cellulose acylate film is suitable for use as a protective film.

Hereinafter, materials that may be incorporated in the cellulose acylate film of the present invention are explained in detail.

<1 Compounds of this Invention>

The cellulose acylate film of the present invention includes a compound represented by the following Formula (I) or (II).

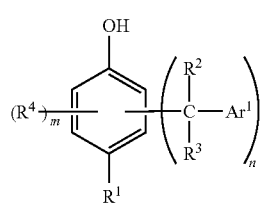

Formula (I)

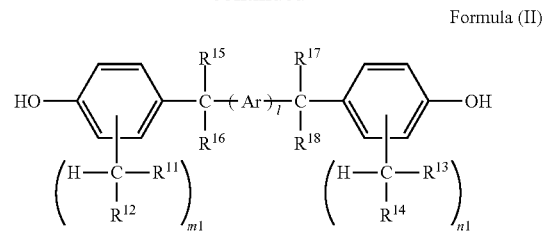

Formula (II)

In Formula (I), $R^1$ represents an unsubstituted straight chain, branched or cyclic alkyl group having 1 to 12 carbon atoms, $R^2$ and $R^3$ each independently represent a hydrogen atom, an alkyl group having 1 to 6 carbon atoms, or an aryl group, $R^4$ represents an unsubstituted alkyl group having 1 to 6 carbon atoms, and $Ar^1$ represents a substituted or unsubstituted aromatic group. m represents an integer of 0 to 3, and n represents an integer of 1 to 4, provided that when n is 1, $Ar^1$ represents an unsubstituted aromatic group.

In Formula (II), $R^{11}$ to $R^{14}$ each independently represent a hydrogen atom, or an alkyl group having 1 to 8 carbon atoms. $R^{11}$ and $R^{12}$, and/or, $R^{13}$ and $R^{14}$ may bond to one another to form a ring. $R^{15}$ and $R^{17}$ each independently represent an unsubstituted alkyl group having 1 to 8 carbon atoms, and $R^{16}$ and $R^{18}$ each independently represent a hydrogen atom, or an unsubstituted alkyl group having 1 to 8 carbon atoms. Ar represents a substituted or unsubstituted arylene group having 6 to 18 carbon atoms. l, m1 and n1 independently represent an integer of 1 to 4.

First, a compound represented by formula (I) of this invention is described below.

[Compound Represented by Formula (I)]

One of the compounds used in the present invention is the compound represented by the above-described Formula (I).

Of the unsubstituted straight chain, branched or cyclic alkyl group having 1 to 12 carbon atoms as $R^1$, the carbon number of the unsubstituted straight chain or branched alkyl group is preferably from 1 to 10, more preferably from 1 to 8, and further more preferably from 4 to 8. The carbon number of the cyclic alkyl group, i.e., the cycloalkyl group, is preferably from 3 to 12, more preferably from 5 to 12, and further more preferably from 5 to 10. Here, a cycloalkyl ring of the cycloalkyl group is preferably from 3- to 7-membered rings, more preferably from 3- to 6-membered rings, further more preferably a 5- or 6-membered ring, and especially preferably a 6-membered ring. Note that the cycloalkyl ring may have an alkyl group.

Examples of the unsubstituted straight chain, branched or cyclic alkyl group having 1 to 12 carbon atoms as $R^1$ include methyl, ethyl, n-propyl, isopropyl, n-butyl, sec-butyl, isobutyl, tert-butyl, n-pentyl, tert-amyl, n-hexyl, n-heptyl, n-octyl, 2-ethylhexyl, tert-octyl, n-nonyl, n-decyl, n-undocyl, n-dodecyl, cyclopropyl, cyclopentyl, cyclohexyl and adamantyl.

Among these, $R^1$ is preferably a methyl group or a tert-butyl group.

The carbon number of the alkyl group having 1 to 6 carbon atoms as $R^2$ and $R^3$ is preferably from 1 to 4, and more preferably 1 or 2. Although the above alkyl group may be straight chain, branched or cyclic, it is preferably a straight chain. Examples of the alkyl group as $R^2$ and $R^3$ include methyl, ethyl, n-hexyl, isohexyl, cyclopropyl, cyclopentyl and cyclohexyl.

The carbon number of the aryl group as $R^2$ and $R^3$ is preferably from 6 to 12, more preferably from 6 to 10, and still more preferably from 6 to 8. Examples of the aryl group as $R^2$ and $R^3$ include phenyl, tryl, 2,4-dimethylphenyl and naphthyl.

The alkyl group and the aryl group as $R^2$ and $R^3$ may have a substituent.

Here, the substituent is not particularly limited and examples thereof include:

alkyl groups (preferably those having from 1 to 10 carbon atoms, for example, methyl, ethyl, isopropyl, t-butyl, pentyl, heptyl, 1-ethylpentyl, benzyl, 2-ethoxyethyl, 1-carboxymethyl and the like);

alkenyl groups (preferably those having from 2 to 20 carbon atoms, for example, vinyl, allyl, oleyl and the like);

alkynyl groups (preferably those having from 2 to 20 carbon atoms, for example, ethynyl, butadiynyl, phenylethynyl and the like);

cycloalkyl groups (preferably those having from 3 to 20 carbon atoms, for example, cyclopropyl, cyclopentyl, cyclohexyl, 4-methylcyclohexyl and the like);

aryl groups (preferably those having from 6 to 26 carbon atoms, for example, phenyl, 1-naphtyl, 4-methoxyphenyl, 2-chlorophenyl, 3-methylphenyl and the like);

hetrocyclic groups (those preferably having from 2 to 20 carbon atoms and preferably having a ring-constituting atom selected from an oxygen atom, a nitrogen atom or a sulfur atom, and those preferably having a 5- or 6-membered ring which may be condensed with a benzene ring or a hetero ring, and said ring may be a saturated ring, an unsaturated ring or an aromatic ring, for example, 2-pyridyl, 4-pyridyl, 2-imidazolyl, 2-benzoimidazolyl, 2-thiazolyl, 2-oxazolyl and the like);

alkoxy groups (preferably those having from 1 to 20 carbon atoms, for example, methoxy, ethoxy, isopropyloxy, benzyloxy and the like);

aryloxy groups (preferably those having from 6 to 26 carbon atoms, for example, phenoxy, 1-naphthyloxy, 3-methylphenoxy, 4-methoxyphenoxy and the like);

alkylthio groups (preferably those having from 1 to 20 carbon atoms, for example, methylthio, ethylthio, isopropylthio, benzylthio and the like);

arylthio groups (preferably those having from 6 to 26 carbon atoms, for example, phenylthio, 1-naphtylthio, 3-methylphenylthio, 4-methoxyphenylthio and the like);

acyl groups (those including an alkylcarbonyl group, an alkenylcarbonyl group, an arylcarbonyl group and a heterocyclic carbonyl group, and preferably having 20 or less than 20 carbon atoms, for example, acetyl, pivaloyl, acryloyl, methacryloyl, benzoyl, nicotinoyl and the like);

alkoxycarbonyl groups (preferably those having from 2 to 20 carbon atoms, for example, ethoxycarbonyl, 2-ethylhexyloxycarbonyl and the like);

aryloxycarbonyl groups (preferably those having from 7 to 20 carbon atoms, for example, phenyloxycarbonyl, naphthyloxycarbonyl and the like);

amino groups (those including an amino group, an alkylamino group, an arylamino group and a heterocyclic amino group, and preferably having from 0 to 20 carbon atoms, for example, amino, N,N-dimethylamino, N,N-diethylamino, N-ethylamino, anilino, 1-pyrrolidinyl, piperidino, morpholinyl and the like);

sulfonamido groups (preferably those having from 0 to 20 carbon atoms, for example, N,N-dimethylsulfonamido, N-phenylsulfonamido and the like);

sulfamoyl groups (preferably those having from 0 to 20 carbon stoms, for example, N,N-dimethylsulfamoyl, N-phenylsulfamoyl and the like);

acyloxy groups (preferably those having from 1 to 20 carbon atoms, for example, acetyloxy, benzoyloxy and the like);

carbamoyl groups (preferably those having from 1 to 20 carbon atoms, for example, N,N-dimethyl carbamoyl, N-phenylcarbamoyl and the like);

acylamino groups (preferably those having from 1 to 20 carbon atoms, for example, acetylamino, acryloylamino, benzoylamino, nicotine amido and the like);

a cyano group; a hydroxyl group; a mercapto group; and a halogen atom (for example, fluorine, chlorine, bromine, iodine and the like).

Here, the substituent in the case where $R^2$ and $R^3$ are an aryl group is preferably an alkyl group or an alkoxy group, and more preferably an alkyl group.

$R^2$ and $R^3$ are preferably a hydrogen atom, an unsubstituted alkyl group having from 1 to 6 carbon atoms or an unsubstituted aryl group, and more preferably a hydrogen atom, an unsubstituted alkyl group having from 1 to 6 carbon atoms.

Although the unsubstituted alkyl group having from 1 to 6 carbon atoms as $R^4$ may be in any of straight chain, branch and circularity, it is preferably a straight chain or branched alkyl group, and more preferably a straight chain alkyl group.

The carbon number of the alkyl group as $R^4$ is preferably from 1 to 4, more preferably 1.

Examples of alkyl group as $R^4$ include methyl, ethyl, n-propyl, isopropyl, n-butyl, isobutyl, sec-butyl, t-butyl, n-pentyl, isopentyl, n-hexyl, isohexyl, cyclopropyl, cyclopentyl and cyclohexyl.

The aromatic group as $Ar^1$ may have a substituent and examples of the substituent include substituents described above. Among these substituents, an alkyl group and an alkoxy group are preferred, and an alkyl group is more preferred.

Further in the present invention, an unsubstituted aromatic group is still more preferred as $Ar^1$.

The carbon number of the aromatic group as $Ar^1$ is preferably from 6 to 12, more preferably from 6 to 10 and still more preferably from 6 to 8. Examples of $Ar^1$ include phenyl, tryl, 2,4-dimethylphenyl and naphthyl.

In the present invention, a compound having at least one, preferably two of a plurality of the structures represented by —C($R^2$)($R^3$)($Ar^1$) at the ortho position with respect to the phenolic hydroxyl group is preferred.

In the case where m is 2 or greater, a plurality of $R^1$ may be the same or different from one another, and in the case where n is 2 or more, a plurality of —C($R^2$)($R^3$)($Ar^1$) may be the same or different from one another.

m is preferably 0 or 1, more preferably 0.

n is preferably 1 or 2, particularly preferably 2. When n is 1, m is preferably 0 to 2, more preferably 1 or 2, particularly preferably 1.

When n is 1, $Ar^1$ represents an unsubstituted aromatic group.

The compound represented by Formula (I) of the present invention is preferably a compound represented by the following Formula (IA), more preferably a compound represented by the following Formula (IB), and still more preferably a compound represented by the following Formula (IC).

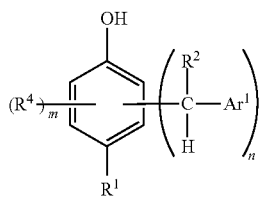

Formula (IA)

In Formula (IA), $R^1$, $R^2$, $R^4Ar^1$, m and n are the same meanings as those of $R^1$, $R^2$, $R^4Ar^1$, m and n in the Formula (I), respectively.

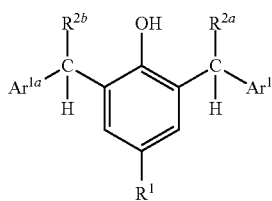

Formula (IB)

In Formula (IB), $R^1$ and $Ar^1$ are the same meanings as those of $R^1$ and $Ar^1$ in the Formula (I), respectively. Each of $R^{2a}$ and $R^{2b}$ independently represents a hydrogen atom or an alkyl group having 1 to 6 carbon atoms, $Ar^{1a}$ is the same meaning as that of $Ar^1$ above.

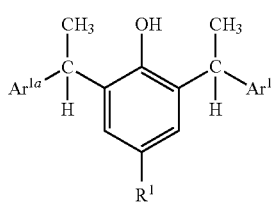

Formula (IC)

In Formula (IC), $R^1$ and $Ar^1$ are the same meanings as those of $R^1$ and $Ar^1$ in the Formula (I), respectively. $Ar^{1a}$ is the same meaning as that of $Ar^1$.

Next, a compound represented by formula (II) used in this invention is described below.

[Compound Represented by Formula (II)]

In the second embodiment of the present invention, the compound represented by the above-described Formula (II) is used.

The carbon number of the alkyl group having 1 to 8 carbon atoms as $R^{11}$ to $R^{14}$ is preferably from 1 to 3, and more preferably 1 or 2.

Examples of the alkyl group having 1 to 8 carbon atoms as $R^{11}$ to $R^{14}$ include methyl, ethyl, n-propyl, isopropyl, n-butyl and n-octyl.

$R^{11}$ and $R^{12}$, and/or, $R^{13}$ and $R^{14}$ may bond to one another (i.e. $R^{11}$ may bond to $R^{12}$, and/or, $R^{13}$ may bond to $R^{14}$) to form a ring. The formed ring is preferably from 3- to 7-membered rings, more preferably from 5- to 7-membered rings, still more preferably a 5- or 6-membered ring, and especially preferably a 6-membered ring. Further, although the formed ring may be a saturated ring or an unsaturated ring other than an aromatic ring, it is preferably a saturated ring.

Examples of the formed ring include cyclopropyl, cyclopentyl and cyclohexyl.

The alkyl group having from 1 to 8 carbon atoms as $R^{11}$ to $R^{14}$ may have a substituent. The ring formed by the binding of $R^{11}$ and $R^{12}$, and/or, by the biding of $R^{13}$ and $R^{14}$ may have a substituent.

Here, the substituent is not particularly limited and examples thereof include those exemplified as the substituent in the above-described Formula (I).

The alkyl group of $R^{11}$ to $R^{14}$ is preferably an unsubstituted alkyl group.

Further, although the ring formed by the binding of $R^{11}$ and $R^{12}$, and/or, by the binding of $R^{13}$ and $R^{14}$ preferably has an alkyl group as a substituent, the ring is more preferably an unsubstituted ring.

A compound having at least one structure of a plurality of —$CH(R^{11})(R^{12})$ or —$CH(R^{13})(R^{14})$ at the ortho position with respect to the phenolic hydroxyl group is preferred.

In the present invention, especially, a preferable embodiment is that each of $R^{11}$ to $R^{14}$ is a hydrogen atom or an alkyl group having 1 to 6 carbon atoms, and two groups of $R^{11}$ to $R^{14}$ substituted at the site of the same carbon atom are a hydrogen atom or an alkyl group together at the same time.

Here, specifically, the two groups of $R^{11}$ to $R^{14}$ substituted at the site of the same carbon atom means a combination of $R^{11}$ and $R^{12}$ and a combination of $R^{13}$ and $R^{14}$, and all of the combination of $R^{11}$ and $R^{12}$ and the combination of $R^{13}$ and $R^{14}$ which exist in the molecule.

The carbon number of the unsubstituted alkyl group having from 1 to 8 carbon atoms as $R^{15}$ to $R^{18}$ is preferably from 1 to 6, more preferably from 1 to 4, and still more preferably 1 or 2. Especially, the carbon number is preferably 1, that is, methyl is preferred. Further, both of $R^{16}$ and $R^{18}$ are preferably an unsubstituted alkyl group having from 1 to 8 carbon atoms.

Examples of the unsubstituted alkyl group having 1 to 8 carbon atoms as $R^{15}$ to $R^{18}$ include methyl, ethyl, isopropyl, n-propyl and n-octyl.

The carbon number of the substituted or unsubstituted arylene group having from 6 to 18 carbon atoms as Ar is preferably from 6 to 12, more preferably from 6 to 10, still more preferably from 6 to 8, and specially preferably 6.

The substituted or unsubstituted arylene group having from 6 to 18 carbon atoms as Ar may have a substituent and examples thereof include the substituents described above. Among these substituents, an alkyl group is preferred. In the present invention, an unsubstituted arylene group is particularly preferred.

Examples of the substituted or unsubstituted arylene group having from 6 to 18 carbon atoms as Ar include a phenylene group and a naphthylene group. A phenylene group is preferred. Further, of the phenylene group, a 1,4-phenylene group and a 1,3-phenylene group are preferred.

l is preferably an integer of 1 to 3, more preferably 2 or 3, and especially preferably 1.

Note that when l is 2, (—Ar—)$_l$ is preferably a biphenylene group.

m1 and n1 are preferably 1 or 2, particularly preferably 2.

It is noted that when a plurality of l exists, plural Ar may be the same or different from one another, when m1 is 2 or greater, plural —$CH(R^{11})(R^{12})$ may be the same or different from one another, and when n1 is 2 or greater, plural —$CH(R^{13})(R^{14})$ may be the same or different from one another.

The compound represented by Formula (II) used in the present invention is preferably a compound represented by the following Formula (IIA), more preferably a compound represented by the following Formula (IIB), and still more preferably a compound represented by the following Formula (IIC).

Formula (IIA)

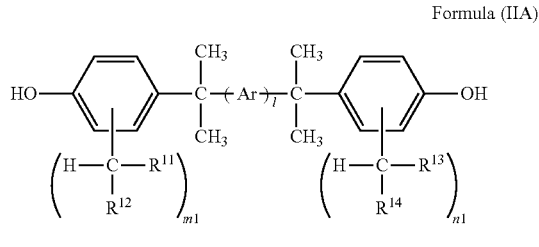

In Formula (IIA), $R^{11}$ to $R^{14}$, Ar, l, m1 and n1 have the same meanings as those of $R^{11}$ to $R^{14}$, Ar, l, m1 and n1 in the Formula (II), respectively.

Formula (IIB)

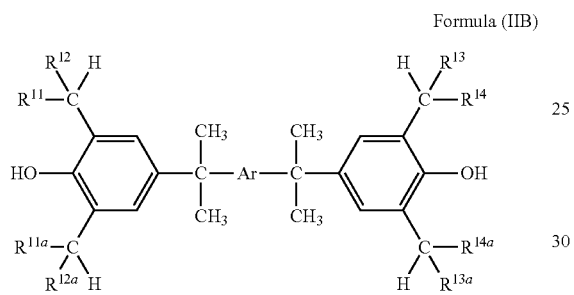

In Formula (IIB), $R^{11}$ to $R^{14}$ and Ar are the same meanings as those of $R^{11}$ to $R^{14}$ and Ar in the Formula (II), respectively. $R^{11a}$ to $R^{14a}$ are the same meanings as those of $R^{11}$ to $R^{14}$.

Among the compounds represented by formula (IIB), the each of $R^{11}$ to $R^{14}$ and the each of $R^{11a}$ to $R^{14a}$ is preferably a hydrogen atom, or an alkyl group having 1 to 6 carbon atoms, and among $R^{11}$ to $R^{14}$ and $R^{11a}$ to $R^{14a}$, two groups substituted at site of the same carbon atom are simultaneously a hydrogen atom or simultaneously the alkyl group.

Formula (IIC)

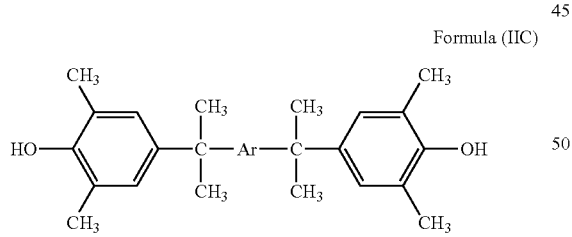

In Formula (IIC), Ar is the same meaning as that of Ar in the Formula (II).

The molecular weight of the compound represented by Formula (I) or (II) is preferably from 200 to 1200, more preferably from 250 to 800, and particularly preferably from 300 to 600.

Setting of the molecular weight to 200 or greater is preferable because sublimation of the compound from a film can be suppressed. Setting of the molecular weight to 1200 or lower is preferable from the viewpoint that generation of haze can be suppressed.

Hereinafter, specific examples of the compounds used in the present invention are shown, but the present invention is not limited thereto.

*Compound Represented by Formula (I)*

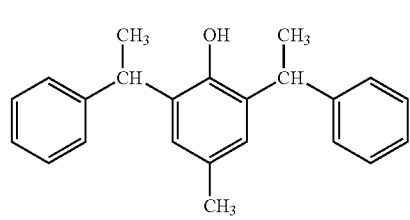
A-1

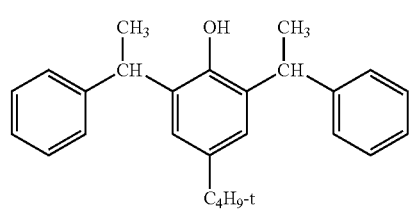
A-2

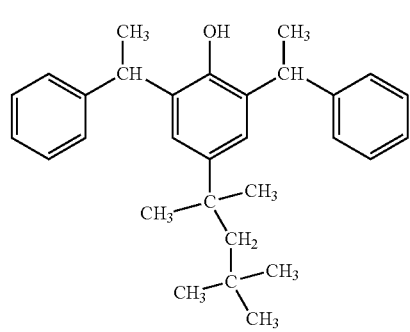
A-3

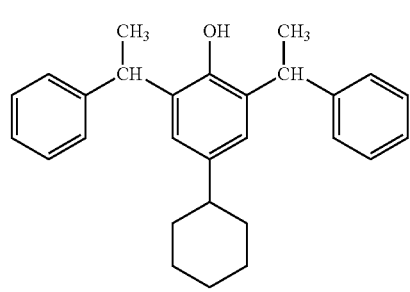
A-4

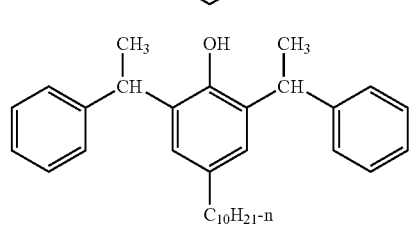
A-5

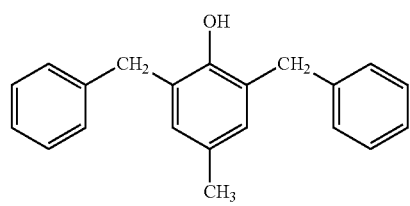
A-6

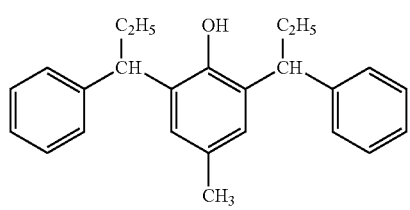
A-7
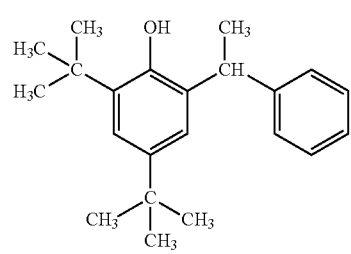
A-13
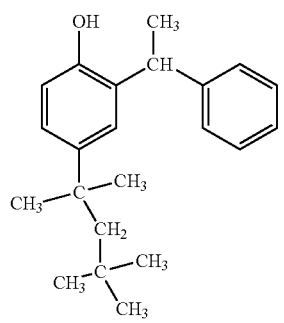
A-8
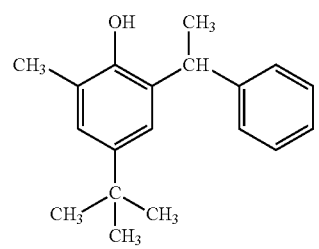
A-14
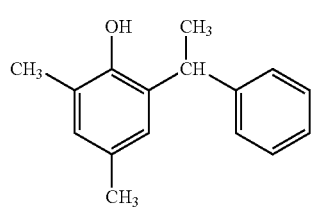
A-9
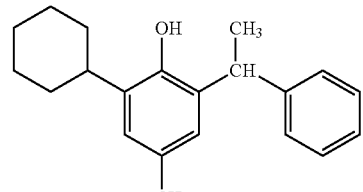
A-15
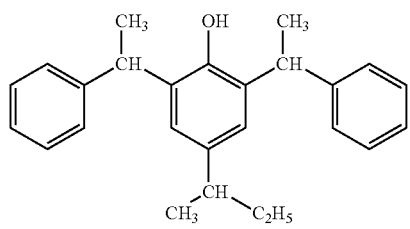
A-10
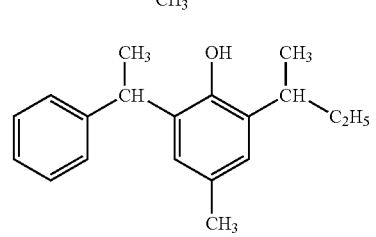
A-16
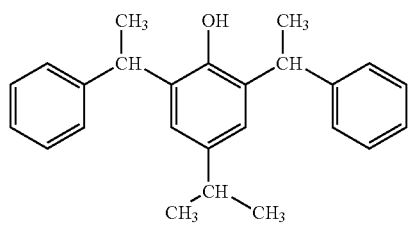
A-11
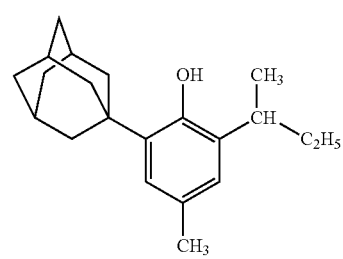
A-17
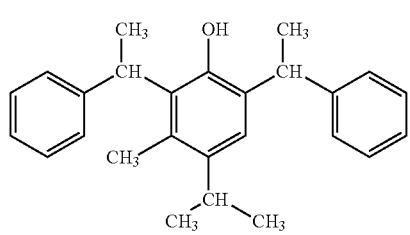
A-12
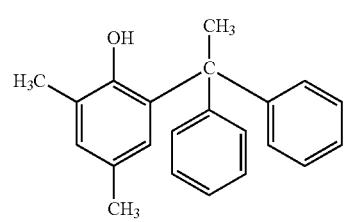
A-18
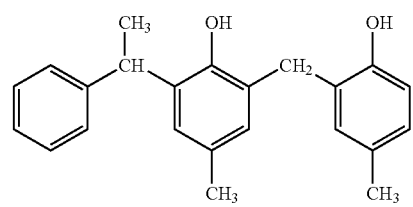
A-19

A-20
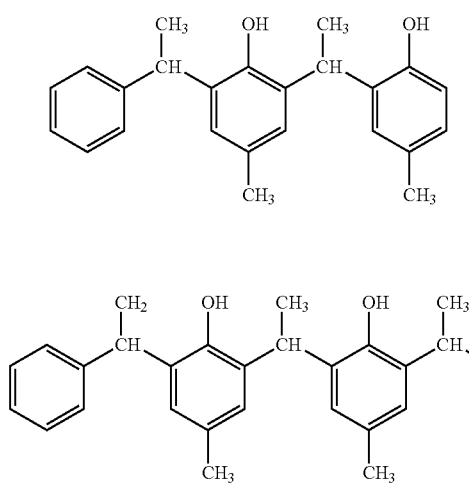
A-21
*Compound represented by formula (II)*
B-1
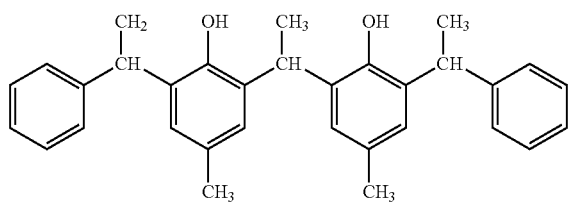
B-2
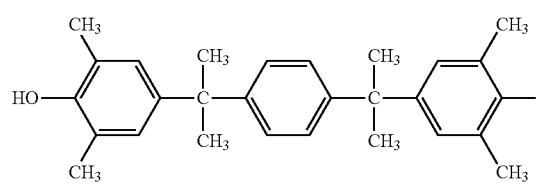
B-3
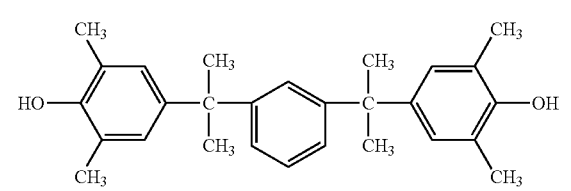
B-4
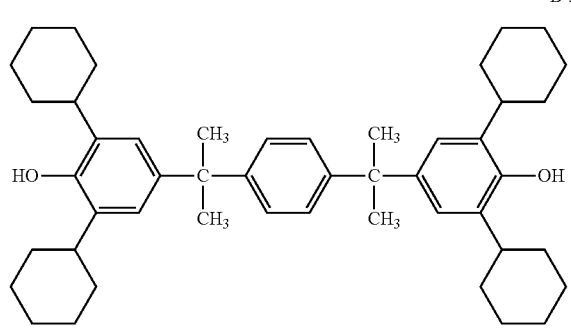
B-5
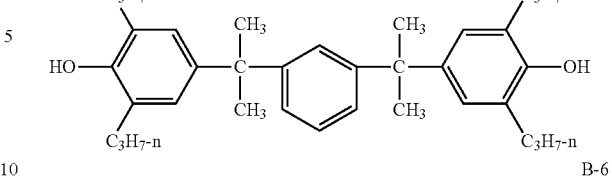
B-6
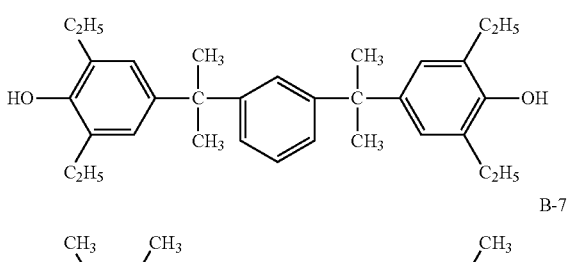
B-7
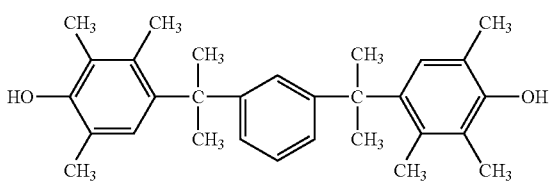
B-8
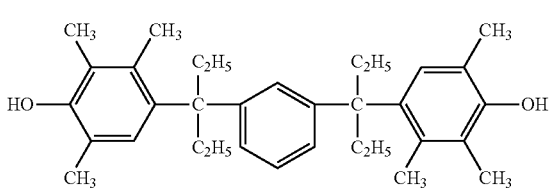
B-9
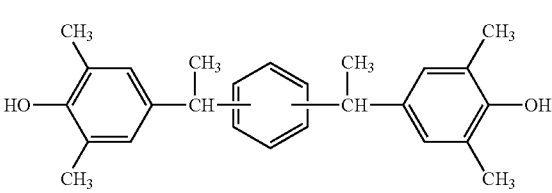
B-10
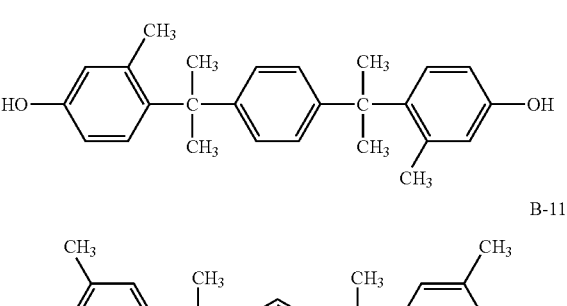
B-11
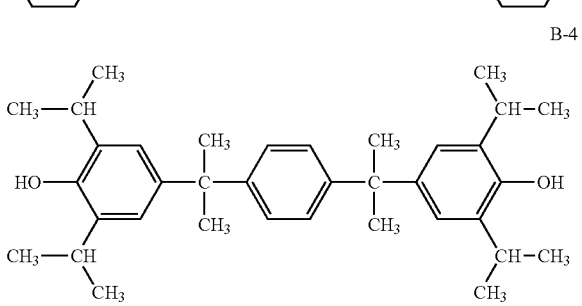
B-12
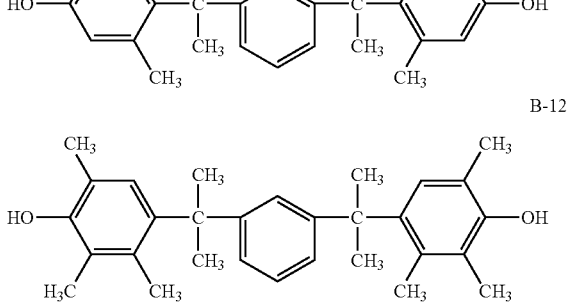

-continued

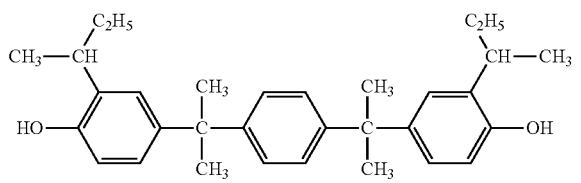
B-13

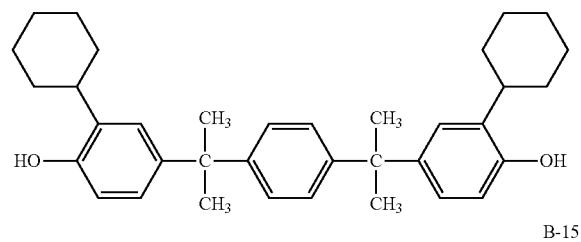
B-14

B-15

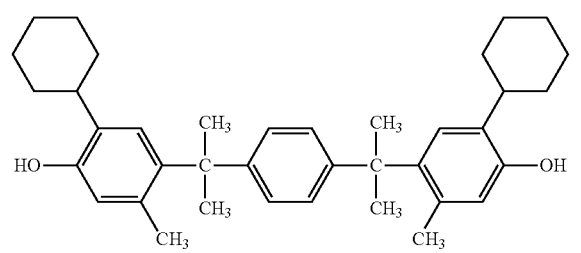
B-16

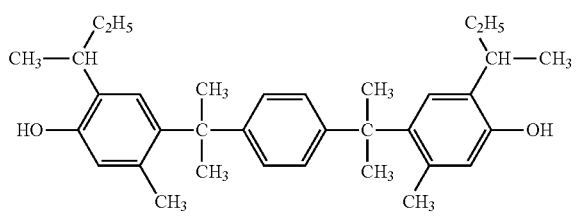
B-17

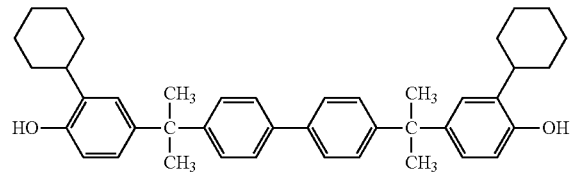
B-18

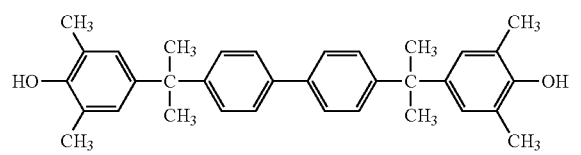

Generally, the compound represented by Formula (I) or (II) can be easily synthesized by, for example, addition reaction of a phenol derivative and an olefin compound (for example, styrene and the like) under an acid catalyst.

Although the content of the compound represented by Formula (I) or (II) in cellulose acylate is not particularly limited, the content is preferably from 0.1 to 20 parts by mass, more preferably from 0.2 to 15 parts by mass, and particularly preferably from 0.3 to 10 parts by mass, with respect to 100 parts by mass of cellulose acylate.

It is preferable to set the content of the compound in cellulose acylate to 0.1 parts by mass or greater, because water-vapor transmission ratio can be effectively reduced. Setting of the content to 20 or lower is preferable from the viewpoint that generation of haze can be suppressed. In the case where two or more kinds of compounds represented by Formula (I), two or more kinds of compounds represented by Formula (II), or a mixture of a compound represented by Formula (I) and a compound represented by Formula (II) are used in combination, it is preferable that the total amount thereof is within the above-described range.

<2 Cellulose Acylate>

In the present invention, cellulose acylate is used as a main component of the cellulose acylate film. Here, in the present specification, with respect to the embodiment in which a component constituting a raw material is one kind, the term "main component" means the component. While, on the other hand, with respect to the embodiment in which a component constituting the raw material is composed of two kinds or more component parts, the term "main component" means a component part which has the highest mass fraction of the component parts. One kind of cellulose acylate may be used, or alternatively two or more kinds thereof may be used. The cellulose acylate may be a cellulose acylate having, for example, only an acetyl group as the acyl substituent thereof. Alternatively, a cellulose acylate having a plurality of different acyl groups as the acyl substituent thereof may be used. The cellulose acylate may be a mixture of cellulose acylates that are different from one another.

The cellulose material for cellulose acylate which is used in this invention includes cotton liter and wood pulp (hardwood pulp, softwood pulp), and cellulose acylate obtained from any such cellulose material are usable herein. Those cellulose material may be mixed for use herein. The cellulose materials are described in detail, for example, in Marusawa & Uda's "Plastic Material Lecture (17), Cellulose Resin" by Nikkan Kogyo Shinbun (1970) and Hatsumei Kyokai's Disclosure Bulletin 2001-1745 (pp. 7-8), and those celluloses described therein may be usable herein.

In the present specification, the acyl group of the cellulose acylate may be one kind, or two or more kinds of acyl groups. It is preferable that the cellulose acylate used in the present invention has an acyl group having 2 to 4 carbon atoms as a substituent. When two or more kinds of acyl groups are used, it is preferable that one of the acyl groups is an acetyl group and another acyl group having 2 to 4 carbon atoms is preferably propionyl or butyryl. By these cellulose acylates, a solution with a good solubility can be prepared. Especially in a non-chlorine organic solvent, preparation of a good solution becomes possible with these cellulose acylates. Further, preparation of a solution having a low viscosity and a good filterability becomes possible.

First, cellulose acylate preferably used in the present invention is described in detail.

The glucose unit having β-1,4 bonds which constitutes cellulose has free hydroxyl groups at the 2-, 3-, and 6-positions thereof. The cellulose acylate is a polymeric substance (polymer) in which a part of or all of these hydroxyl groups is or are acylated.

The acyl substitution degree indicates a degree of acylation of the hydroxyl groups located at the 2-, 3-, and 6-positions of cellulose. When each of the hydroxyl groups at the 2-, 3-, and 6-positions of all of the glucose units is acylated, the total acyl substitution degree is 3. For example, when each of the hydroxyl groups only at the 6-position of all of the glucose units is acylated, the total acyl substitution degree is 1. In the same manner, even if each of the hydroxyl groups at either the 6-position or the 2-position of all of the glucose unit is acylated, the total acyl substitution degree is 1.

That is to say, the acyl substitution degree indicates a degree of acylation, provided that when all of the hydroxyl groups of the glucose molecule are entirely acylated, the acyl substitution degree is 3.

The total acyl substitution degree (A) of the cellulose acylate used in the present invention is preferably from 1.5 to 3 ($1.5 \leq A \leq 3.0$), more preferably from 2.0 to 2.97, still more preferably from 2.5 to less than 2.97, and particularly preferably from 2.70 to 2.95.

When the acyl group of the cellulose acylate used in the present invention is only an acetyl group, the total acetyl substitution degree (B) is preferably from 2.0 to 3 ($2.0 \leq B \leq 53.0$), more preferably from 2.0 to 2.97, still more preferably from 2.5 to less than 2.97, and particularly preferably from 2.70 to 2.95.

The acyl group having 2 or greater carbon atoms of the cellulose acylate used in the present invention is not particularly limited such that it may be an aliphatic acyl group or an aromatic acyl group. Examples thereof include cellulosic alkylcarbonyl esters, alkenylcarbonyl esters, aromatic carbonyl esters, and aromatic alkylcarbonyl esters, each of which may have a substituted group. Preferable examples thereof include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexane carbonyl, oleoyl, benzoyl, naphthyl carbonyl, and cinnamoyl. Among these, acetyl, propionyl, butanoyl, decanoyl, octadecanoyl, tert-butanoyl, oleoyl, benzoyl, naphthyl carbonyl, cinnamoyl and the like are more preferred. Particularly, acetyl, propionyl and butanoyl (the case where the carbon number of the acyl group is from 2 to 4) are preferred. Especially, acetyl (the case where the cellulose acylate is cellulose acetate) is more preferred.

In the case where an acid anhydride or an acid chloride is used as an acylating agent in acylation of the cellulose, an organic acid, for example, acetic acid, methylene chloride and the like, is used as an organic solvent which acts as a reaction solvent.

As for the catalyst, when the acylating agent is an acid anhydride, a protic catalyst such as sulfuric acid is preferably used. While, when the acylating agent is an acid chloride (for example, $CH_3CH_2COCl$), a basic compound is used.

A most common industrial method for the synthesis of a mixed fatty acid ester of cellulose is a method of acylating cellulose with a mixed organic acid component that includes fatty acids corresponding to an acetyl group and to any other acyl group (acetic acid, propionic acid, valeric acid and the like) or their acid anhydrides.

The cellulose acylate may be produced, for example, according to the method described in JP-A-10-45804.

The film of the present invention contains the cellulose acylate in the proportion of preferably from 5 to 99% by mass, more preferably from 20 to 99% by mass, and particularly preferably from 50 to 95% by mass, with respect to the total solid content of the film, from the viewpoint of water-vapor transmission ratio.

<3 Other Additives>

To the cellulose acylate film of the present invention, a retardation-controlling agent (retardation-developing agent and retardation-reducing agent), and as a plasticizer, a polycondensation ester compound (polymer) and a polyvalent ester of polyvalent alcohol, for example, a phthalic acid ester, a phosphoric acid ester and the like, and further additives such as a ultraviolet absorber, an antioxidant and a mat agent may be added.

In the present specification, when compound groups are described, they may be described incorporating therein the expression "-based", for example, like a phosphoric acid ester-based compound. However, in this case, this means the same as the phosphoric acid ester compound.

(Retardation-reducing Agent)

In the present invention, as a retardation-reducing agent, a phosphoric acid ester-based compound and a compound other than the non-phosphoric acid ester-based compound known as an additive for the cellulose acylate film may be generally adopted.

The polymer retardation-reducing agent is selected from a phosphoric acid ester-based polymer, a styrene-based polymer, an acrylic polymer and their copolymers. Of these, an acrylic polymer and a styrene-based polymer are preferred. Further, at least one polymer having a negative intrinsic birefringence, such as a styrene-based polymer and an acrylic polymer is preferred.

A low molecular retardation-reducing agent that is the compound other than the non-phosphoric acid ester-based compound is described below. These compounds may be a solid or an oily matter. That is, their melting point and boiling point are not particularly limited. For example, they may be a mixture of an ultraviolet absorber of 20° C. or lower and an ultraviolet absorber of 20° C. or higher, or a mixture of degradation inhibitors in the same manner. Further, an infrared-absorbing dye is described in, for example, JP-A-2001-194522. Further, as for the timing for their addition, additives may be added at any time during preparation processes of a cellulose acylate solution (dope). The dope preparation may be performed by incorporating the preparation process in which an additive is added, into the last preparation process of the dope preparation processes. Further, the addition amount of each material is not particularly limited, as long as their functions are exhibited.

The low molecular retardation-reducing agent that is the compound other than the non-phosphoric acid ester-based compound is not particularly limited. Details thereof are described in paragraph Nos. [0066] to [0085] of JP-A-2007-272177.

The compound represented by Formula (I) described in the paragraphs [0066] to [0085] of JP-A-2007-272177 can be obtained by a condensation reaction of a sulfonyl chloride derivative and an amine derivative, as described in the publication.

The compound represented by Formula (2) described in JP-A-2007-272177 can be obtained by a dehydration condensation reaction of carboxylic acids and amines using a condensation agent (for example, dicyclohexylcarbodiimide (DCC) and the like), or a substitution reaction of a carboxylic acid chloride derivative and an amine derivative, or the like.

It is more preferable from the viewpoint of realizing an Nz factor that the above-described retardation-reducing agent is an Rth reducing agent. Of the retardation-reducing agents, examples of the Rth reducing agent include an acrylic polymer and a styrene-based polymer, and also a low molecular compound represented by any one of Formulae (3) to (7) described in JP-A-2007-272177. Among them, an acrylic polymer and a styrene-based polymer are preferred, and an acrylic polymer is more preferred.

The content of the retardation-reducing agent is preferably set to the proportion of from 0.01 to 30% by mass, more preferably from 0.1 to 20% by mass, and particularly preferably from 0.1 to 10% by mass, with respect to the cellulosic resin. When the addition amount is set to 30% by mass or less, compatibility with the cellulosic resin can be improved, whereby whitening can be suppressed. When two or more kinds of retardation-reducing agents are used, it is preferable that the total amount thereof is within the above-described range.

(Retardation-developing Agent)

The cellulose acylate film of the present invention preferably contains at least one retardation-developing agent in order to develop a value of retardation.

The retardation-developing agent is not particularly limited, and examples thereof include a material including a stick-shaped or disc-shaped compound, and a compound that shows retardation-developing properties of the above-described non-phosphoric acid ester-based compounds. As for the stick-shaped or disc-shaped compound, a compound having at least two aromatic ring can be preferably used as the retardation-developing agent The content of the retardation-developing agent composed of a stick-shaped compound is preferably from 0.1 to 30 parts by mass, and more preferably from 0.5 to 20 parts by mass, with respect to 100 parts by mass of the polymer component including cellulose acylate. The content of the disc-shaped compound that is contained in the retardation-developing agent is preferably less than 3 parts by mass, more preferably less than 2 parts by mass and particularly preferably less than 1 part by mass, with respect to 100 parts by mass of cellulose acylate.

The disc-shaped compound, when compared to the stick-shaped compound, is excellent in Rth retardation-developing properties and therefore preferably used in the case where particularly large Rth retardation is required. Two or more kinds of retardation-developing agents may be used in combination.

The retardation-developing agent preferably has a maximum absorption in the wavelength region of from 250 to 400 nm, and preferably it has substantially no absorption in the visible region.

The details of the retardation-developing agent are described on page 49 of Journal of Technical Disclosure 2001-1745.

(Plasticizer (Hydrophobizing Agent))

The cellulose acylate film of the present invention preferably contains, as a plasticizer (Hydrophobizing agent), at least one compound selected from the group consisting of a polyvalent ester compound of a polyvalent alcohol (hereinafter, referred to as a polyvalent alcohol ester-based plasticizer), a polycondensation ester compound (hereinafter, referred to as a polycondensation ester-based plasticizer) and a carbohydrate compound (hereinafter, referred to as a carbohydrate derivative-based plasticizer).

It is preferable that the plasticizer is able to reduce moisture content while minimizing reduction in glass transition temperature (Tg) of the cellulose acylate film. When these plasticizers are used, they make it possible to suppress diffusion of additives in the cellulose acylate film to a polarizer layer under the conditions of high temperature and high humidity, whereby deterioration of polarizer properties can be improved.

Hereinafter, plasticizers used in this invention are described in detail.

(Polyvalent Alcohol Ester-Based Plasticizer)

A polyvalent alcohol that is a synthetic raw material for a polyvalent alcohol ester-based plasticizer used in the present invention is represented by the following Formula (c).

$$R\alpha-(OH)_{m\alpha} \quad \text{Formula (c)}$$

In Formula (c), $R\alpha$ represents a $m\alpha$-valent organic group, and $m\alpha$ represents a positive integer of 2 or greater.

As a preferable polyvalent alcohol that is incorporated in the above-described Formula (c), for example, the following compounds are exemplified. However, the present invention is not limited thereto.

Examples thereof include adonitol, arabitol, ethyleneglycol, diethyleneglycol, triethyleneglycol, tetraethyleneglycol, 1,2-propane diol, 1,3-propane diol, dipropyleneglycol, tripropyleneglycol, 1,2-butane diol, 1,3-butane diol, 1,4-butane diol, dibutyleneglycol, 1,2,4-butane triol, 1,5-pentane diol, 1,6-hexane diol, hexane triol, galactitol, mannitol, 3-methylpentane-1,3,5-triol, pinacol, sorbitol, trimethylol propane, trimethylol ethane, and xylitol. Especially, triethyleneglycol, tetraethyleneglycol, dipropyleneglycol, tripropyleneglycol, sorbitol, trimethylol propane, and xylitol are preferred.

Among polyvalent alcohol ester-based plasticizers, a polyvalent alcohol ester obtained by using a polyvalent alcohol having 5 or greater carbon atoms is preferred. Particularly preferably, the carbon number of the polyvalent alcohol is from 5 to 20.

The monocarboxylic acid used for synthesis of the polyvalent alcohol ester is not particularly limited, and it is possible to use a known aliphatic monocarboxylic acid, alicyclic monocarboxylic acid, aromatic monocarboxylic acid and the like. When the alicyclic monocarboxylic acid or the aromatic monocarboxylic acid is used, it is preferable from the viewpoint of improving water-vapor transmission properties and reservation properties.

As for the monocarboxylic acid, the following compounds are exemplified. However, the present invention is not limited thereto.

As for the aliphatic monocarboxylic acid, preferred are linear fatty acids or fatty acids having a side chain, each of which has 1 to 32 carbon atoms. The number of carbon atom thereof is more preferably from 1 to 20, and particularly preferably from 1 to 10. Incorporation of acetic acid is preferable because compatibility with a cellulose derivative is increased. It is also preferable that acetic acid and another monocarboxylic acid are mixed to use them.

Preferable examples of the above-described aliphatic monocarboxylic acid include: saturated fatty acids such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, and arachidic acid, behenic acid, rigniceric acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid.

Preferable examples of the above-described alicyclic monocarboxylic acid include cyclopentane carboxylic acid, cyclohexane carboxylic acid, cyclooctane carboxylic acid, and their derivatives.

Preferable examples of the above-described aromatic monocarboxylic acid include benzoic acid, those acids such as toluic acid and the like, in which an alkyl group is introduced into the benzene ring of benzoic acid, aromatic monocarboxylic acids having two or more benzene rings, such as biphenyl carboxylic acid, naphthalene carboxylic acid and tetralin carboxylic acid, and their derivatives. Especially, benzoic acid is preferred.

Although the molecular weight of the polyvalent alcohol ester-based plasticizer is not particularly limited, the molecular weight is preferably from 300 to 3000, and more preferably from 350 to 1500. Setting of the molecular weight to 3000 or less is preferable because volatilization from the cellulose acylate film is suppressed. While, on the other hand, the molecular weight of 300 or greater is preferable from the viewpoints of moisture-vapour permeability and compatibility with cellulose derivatives.

The carboxylic acid used for synthesis of the polyvalent alcohol ester may be one kind or a mixture of two or more kinds thereof. Further, the hydroxyl group of the polyvalent alcohol may be entirely esterified, or a part of the hydroxyl groups may be remained without esterification.

Hereinafter, specific compounds of the polyvalent alcohol ester are shown.

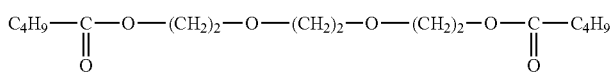

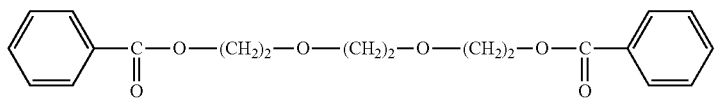

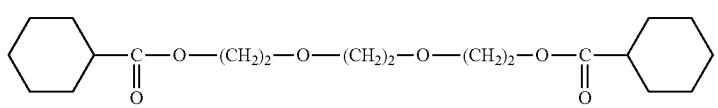

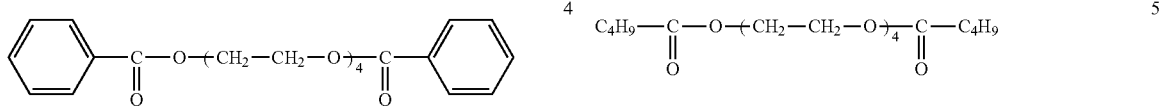

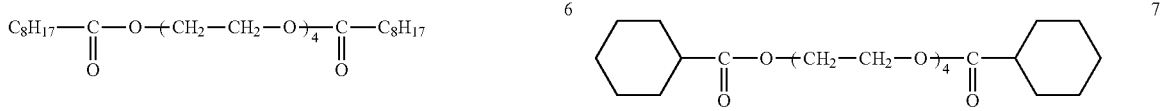

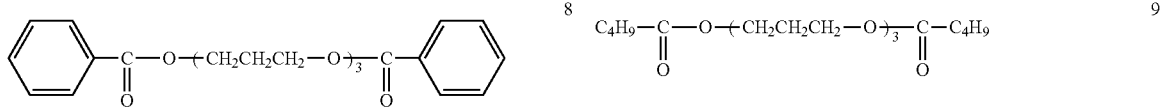

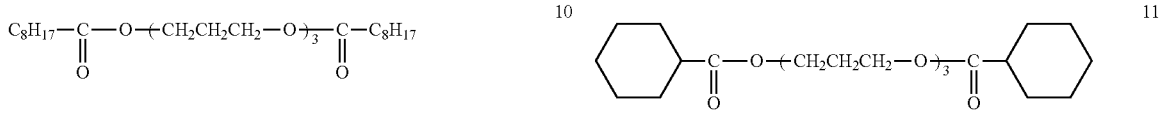

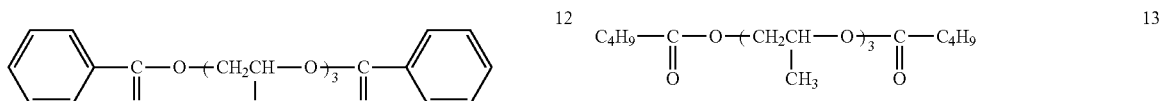

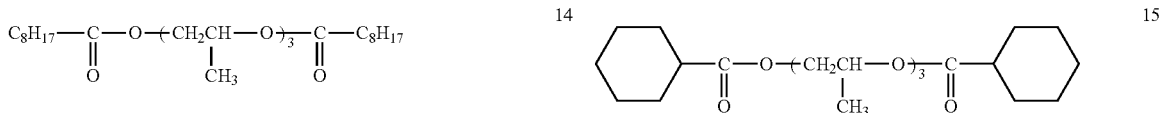

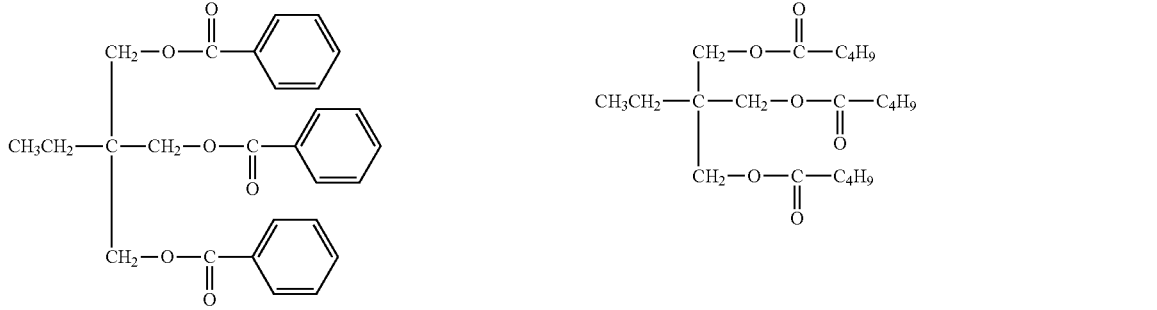

-continued
18
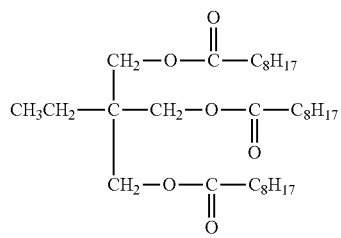
19
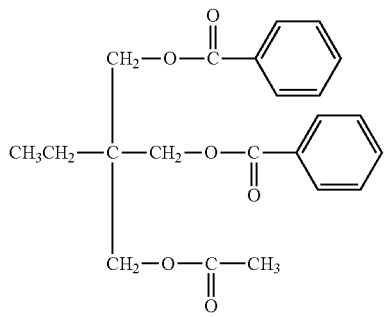
20
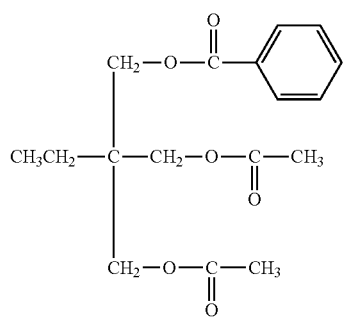
21
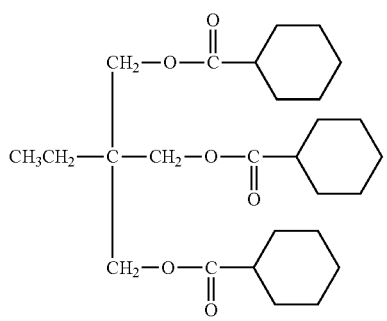
22
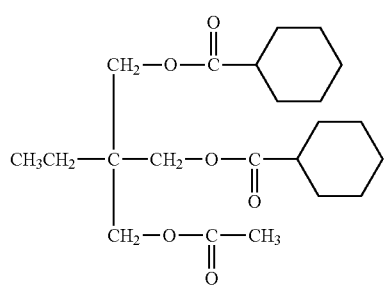
23
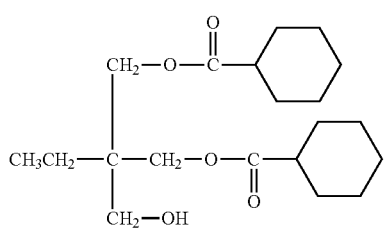
24
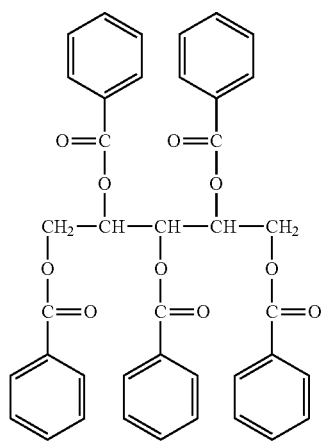
25
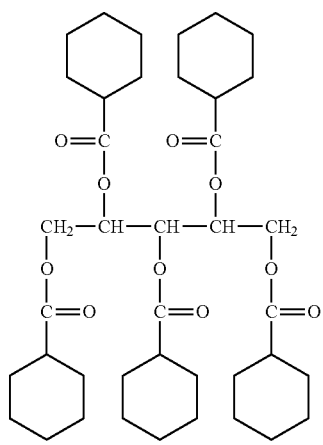

-continued
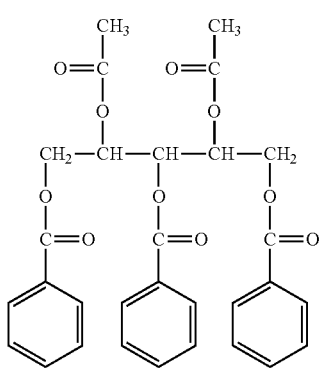
26
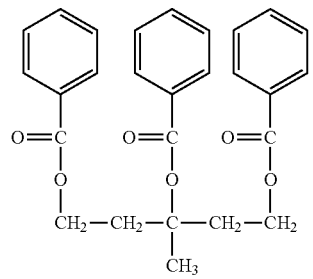
27
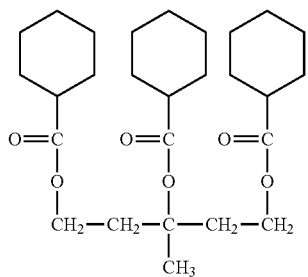
28
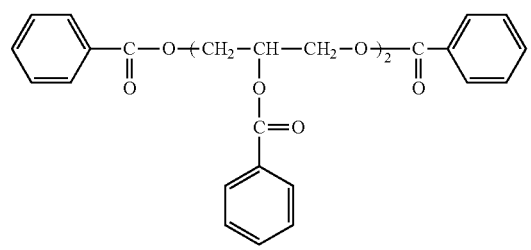
29
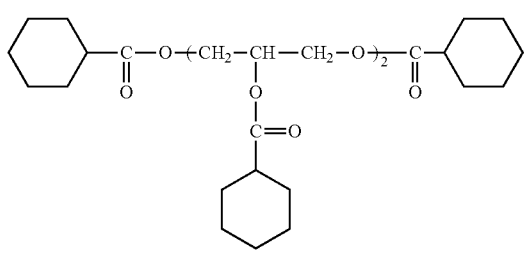
30
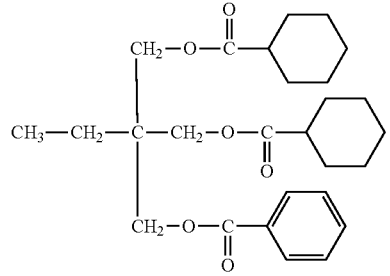
31
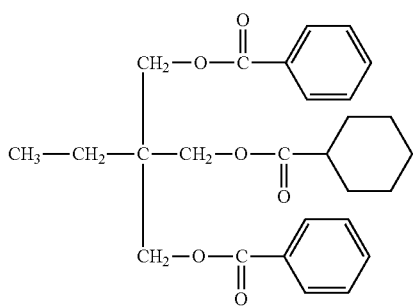
32
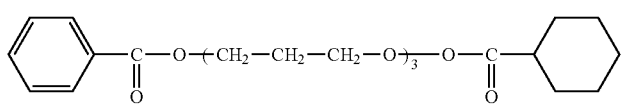
33
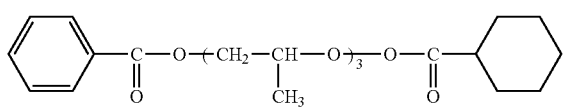
34

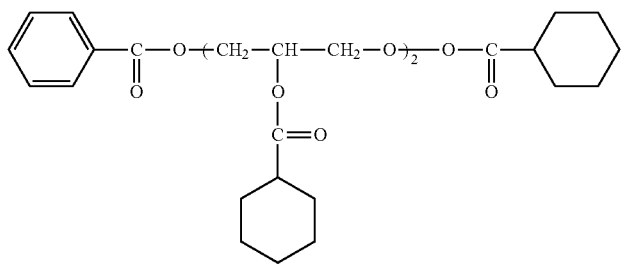

(Polycondensation Ester-based Plasticizer)

Further, the cellulose acylate film of the present invention preferably contains a polycondensation ester-based plasticizer. By incorporating therein the polycondensation ester-based plasticizer, it is possible to achieve a cellulose ester film excellent in humidity stability and a polarizing plate excellent in durability.

The polycondensation ester-based plasticizer is preferably obtained by bringing at least one dicarboxylic acid represented by the following Formula (a) and at least one diol represented by the following Formula (b) into polycondensation.

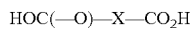  Formula (a)

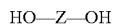  Formula (b)

In Formulae (a) and (b), X represents a divalent aliphatic group having 2 to 18 carbon atoms or a divalent aromatic group having 6 to 18 carbon atoms, and Z represents a divalent aliphatic group having 2 to 8 carbon atoms.

Here, the divalent aliphatic group having 2 to 18 carbon atoms in X may be either saturated or unsaturated, and may be either a divalent chain or a cyclic aliphatic group (for example, cycloalkylene group and the like). Further, in the case of the divalent chain aliphatic group, it may be straight chain or branch. The carbon number of the divalent aliphatic group is more preferably from 2 to 12, and still more preferably from 2 to 6. Among these, the divalent aliphatic group having 2 to 18 carbon atoms is preferably a divalent chain and saturated aliphatic group, more preferably a chain alkylene group, and still more preferably a straight chain alkylene group. Examples of the chain aliphatic group having 2 to 18 carbon atoms include ethylene, trimethylene, tetramethylene, pentamethylene, hexamethylene, heptamethylene, octamethylene, decamethylene, dodecamethylene, propylene, 2-methyl trimethylene, 2,2-dimethyl trimethylene, cyclopentylene, and cyclohexylene.

The divalent aromatic group having 6 to 18 carbon numbers as X may be either a divalent aromatic hydrocarbon group, or a divalent aromatic heterocyclic group. The carbon number of the divalent aromatic group is more preferably from 6 to 15, and still more preferably from 6 to 12. Examples of the aromatic ring of the divalent aromatic hydrocarbon group include a benzene ring, a naphthalene ring, an anthracene ring, a biphenyl ring, and a terphenyl ring. The aromatic heterocyclic group of the divalent aromatic heterocyclic group preferably contains at least one selected from the group consisting of an oxygen atom, a nitrogen atom and a sulfur atom as a ring-forming atom. Example of the aromatic hetero-ring include furan, pyrrole, thiophen, imidazole, pyrazole, pyridine, pyrazine, pyridazine, triazole, triazine, indole, indazole, purine, thiazoline, thiadiazole, oxazole, oxazole, oxadiazole, quinoline, isoquinoline, phthalazine, naphthyridine, quinoxaline, quinazoline, cinnoline, pteridine, acridine, phenanthroline, phenazine, tetazole, benzimidazole, benzoxazole, benzthiazole, benzotriazole and tetrazaindene. Among these, it is preferable that the aromatic ring of the divalent aromatic hydrocarbon group is a benzene ring, a naphthalene ring, or a biphenyl ring, while it is preferable that the aromatic heterocyclic ring of the divalent aromatic heterocyclic group is a pyridine ring, a triazine ring or a quinoline ring.

Z represents a divalent aliphatic group having 2 to 8 carbon atoms. The divalent aliphatic group having 2 to 8 carbon atoms may be either saturated or unsaturated, and may be either a divalent chain or a cyclic aliphatic group (for example, cycloalkylene group and the like). Further, in the case of the divalent chain aliphatic group, it may be the divalent straight chain or branch. The carbon number of the divalent aliphatic group is more preferably from 2 to 6, and still more preferably from 2 to 4. Among these, the divalent aliphatic group having 2 to 8 carbon atoms is preferably a divalent chain and saturated aliphatic group, more preferably a chain alkylene group, and still more preferably a straight chain alkylene group. Examples of the chain alkylene group having 5 to 10 carbon atoms include ethylene, trimethylene, tetramethylene, pentamethylene, hexamethylene, heptamethylene, octamethylene, decamethylene, propylene, 2-methyl trimethylene, 2,2-dimethyl trimethylene.

Further, examples of the divalent cycloalkylene group include cyclopentylene and cyclohexylene.

The polycondensation ester-based plasticizer is preferably obtained from at least one dicarboxylic acid having an aromatic ring (also be called an aromatic dicarboxylic acid) and at least one aliphatic diol having an average carbon number of from 2.5 to 8.0. Further, it is also preferably obtained from a mixture of the aromatic dicarboxylic acid and at least one aliphatic dicarboxylic acid, and at least one aliphatic diol having an average carbon number of from 2.5 to 8.0.

Calculation of an average carbon number of the above-described dicarboxylic acid residue is performed separately from that of a diol residue.

The calculated value of the constituent carbon number multiplied by the composition ratio (mole fraction) of the dicarboxylic acid residue is defined as the average carbon number. For example, in the case where the mixture is composed of an adipic acid residue and a phthalic acid residue in the proportion of each of 50% by mole, the average carbon number is 7.0.

Further in the case of the diol residue, in the same manner as the above, the calculated value of the constituent carbon number multiplied by the composition ratio (mole fraction) of the diol residue is defined as the average carbon number of the diol residue. For example, in the case where the diol is composed of 50 mol % ethylene glycol and 50 mol % 1,2-propane diol, the average carbon number is 2.5.

The number-average molecular weight of the polycondensation ester-based plasticizer is preferably from 500 to 2000, more preferably from 600 to 1500, and still more preferably from 700 to 1200. When the number average molecular weight of the polycondensation ester is 600 or greater, volatility becomes lower so that a film failure and process contamination due to sublimation under the high temperature condition during stretching of the cellulose ester film hardly occurs.

Further, when the number average molecular weight of the polycondensation ester is 2000 or less, compatibility with a cellulose ester becomes higher so that the bleeding during film production and heat-stretching hardly occurs.

The number-average molecular weight of the polycondensation ester can be measured and evaluated by gel permeation chromatography. In the case of a polyesterpolyol whose terminal is not sealed, the number average molecular weight thereof can also be calculated from an amount of the hydroxyl group per mass (hereinafter, also referred to as "a hydroxyl value"). The hydroxyl value in the present specification is a value obtained by acetylating the polyesterpolyol and then measuring an amount (mg) of potassium hydroxide necessary for neutralizing excessive acetic acid.

In the case where a mixture of an aromatic dicarboxylic acid and an aliphatic dicarboxylic acid is used as the dicarboxylic acid component, an average carbon number of the dicarboxylic acid component is preferably from 5.5 to 10.0, and more preferably from 5.6 to 8.

When the average carbon number of the dicarboxylic acid is 5.5 or greater, a polarizing plate having excellent durability can be obtained. When the average carbon number of the dicarboxylic acid is 10 or less, the compatibility with the cellulose ester is excellent so that generation of the bleed during film production process of the cellulose ester film can be suppressed.

The polycondensation ester obtained from a diol compound represented by Formula (b) and a dicarboxylic acid containing an aromatic dicarboxylic acid includes an aromatic dicarboxylic acid residue.

In the specification, the residue means a partial structure of the polycondensation ester and represents a partial structure having a feature of a monomer which forms the polycondensation ester. For example, a dicarboxylic acid residue which is formed from a dicarboxylic acid of HOC(=O)—X—CO$_2$H is —C(=O)—X—C(=O)—. A ratio of the aromatic dicarboxylic acid residue with respect to the polycondensation ester is preferably 40% by mole or greater, and more preferably from 40 to 95% by mole.

When the ratio of the aromatic dicarboxylic acid residue is 40% by mole or greater, a cellulose ester film having a sufficient optical anisotropy is obtained, and a polarizing plate excellent in durability can be obtained. Also, when the ratio of the aromatic dicarboxylic acid residue is 95% by mole or less, compatibility with the cellulose ester becomes excellent, and this makes it possible to hardly cause the bleeding during film production and even during heat stretching of the cellulose ester film.

Examples of the aromatic dicarboxylic acid which is used for the synthesis of the polycondensation ester-based plasticizer include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid and 2,6-naphthalenedicarboxylic acid. Of these aromatic dicarboxylic acids, phthalic acid, terephthalic acid and 2,6-naphthalenedicarboxylic acid are preferred, phthalic acid and terephthalic acid are more preferred, and temphthalic acid is still more preferred.

In the polycondensation ester, the aromatic dicarboxylic acid residue derived from the aromatic dicarboxylic acid used in the mixing is formed.

Specifically, the aromatic dicarboxylic acid residue preferably contains at least one of a phthalic acid residue, a terephthalic acid residue and an isophthalic acid residue, more preferably contains at least one of a phthalic acid residue and a terephthalic acid residue, and still more preferably contains a terephthalic acid residue.

When terephthalic acid is used as the aromatic dicarboxylic acid in synthesis of the polycondensation ester, compatibility with the cellulose ester be more excellent whereby a cellulose ester film in which bleeding hardly occurs during film production and even during heat stretching of the cellulose ester film can be formed. Further, the aromatic dicarboxylic acid may be used singly or in combination of two or more kinds thereof. In the case of using two kinds of aromatic dicarboxylic acids, it is preferable that phthalic acid and terephthalic acid are used in combination.

The combination use of two kinds of aromatic dicarboxylic acids composed of phthalic acid and terephthalic acid is preferred from the standpoint that the polycondensation ester can be softened at ordinary temperature and handling becomes easy.

The content of the terephthalic acid residue in the dicarboxylic acid residue of the polycondensation ester is preferably from 40 to 100% by mole.

When the content of the terephthalic acid residue is 40% by mole or greater, a cellulose ester film exhibiting a sufficient optical anisotropy is obtained.

The polycondensation ester obtained from a diol represented by Formula (b) and a dicarboxylic acid including an aliphatic dicarboxylic acid contains an aliphatic dicarboxylic acid residue.

Examples of the aliphatic dicarboxylic acid which is used for synthesis of the polycondensation ester-based plasticizer include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

In the polycondensation ester, the aliphatic dicarboxylic acid residue derived from the aliphatic dicarboxylic acid used in the synthesis is formed.

An average carbon number of the aliphatic dicarboxylic acid residue is preferably 5.5 to 10.0, more preferably from 5.5 to 8.0, and still more preferably from 5.5 to 7.0. When the average carbon number of the aliphatic dicarboxylic acid residue is 10.0 or less, a loss on heating of the compound can be reduced whereby the occurrence of surface state failure which is considered to be caused by process contamination due to the bleeding during drying process of a cellulose acylate web can be prevented. Also, when the average carbon number of the aliphatic dicarboxylic acid residue is 5.5 or greater, it is preferable because compatibility is excellent and deposition of the polycondensation ester hardly occurs.

Specifically, the aliphatic dicarboxylic residue preferably contains a succinic acid residue, and in the case of using two kinds of aliphatic dicarboxylic residues, it is preferred to contain a succinic acid residue and an adipic acid residue.

That is to say, in synthesis of the polycondensation ester, the aliphatic dicarboxylic acids may be used singly or in combination of two or more kinds thereof. In the case of using two kinds of aliphatic dicarboxylic acids, it is preferred to use succinic acid and adipic acid. In the case of using one kind of aliphatic dicarboxylic acid in synthesis of polycondensation ester, it is preferred to use succinic acid. In these cases, the average carbon number of the aliphatic dicarboxylic acid residue can be adjusted to a desired value and it is preferred from the standpoint of the compatibility with the cellulose ester.

In the present invention, in the mixing for the formation of polycondensation ester, it is preferred to use two or three kinds of dicarboxylic acids. In the case of using two kinds of dicarboxylic acids, it is preferred to use one kind of each of an aliphatic dicarboxylic acid and an aromatic dicarboxylic acid. In the case of using three kinds of dicarboxylic acids, a combination of one kind of an aliphatic dicarboxylic acid and two kinds of aromatic dicarboxylic acids, or a combination of two kinds of aliphatic dicarboxylic acids and one kind of an aromatic dicarboxylic acid may be used. This is because a value of the average carbon number of the dicarboxylic acid residue is easily adjusted, a content of the aromatic dicarboxylic acid residue can be made to fall within a preferred range, and durability of the polarizer can be increased.

The polycondensation ester obtained from a diol compound represented by Formula (b) and a dicarboxylic acid includes a diol residue.

In the present specification, the diol residue which is formed from the diol compound represented by Formula (b) (HO—Z—OH) is —O—Z—O—.

Examples of the diol which synthesizes the polycondensation ester includes an aromatic diol and an aliphatic diol, and in the present invention, it is preferable that the polycondensation ester is synthesized from at least an aliphatic diol.

The polycondensation ester preferably contains an aliphatic diol residue having an average carbon number from 2.5 to 7.0, and more preferably contains an aliphatic diol residue having an average carbon number from 2.5 or 4.0.

When the average carbon number of the aliphatic diol residue is 7.0 or less, compatibility with a cellulose ester is improved, the bleeding hardly occurs, the loss on heating of the compound hardly increases, and occurrence of surface state failure which is considered to be caused by process contamination due to bleeding during drying process of a cellulose acylate web can be prevented. Also, when the average carbon number of the aliphatic diol residue is 2.5 or greater, the synthesis is easy.

As the aliphatic diol used for synthesizing the polycondensation ester-based plastisizer, alkyl diols or alicyclic diols are preferred. For example, ethylene glycol, 1,2-propanediol, 1,3-propanediol, 1,2-butanediol, 1,3-butanediol, 2-methyl-1, 3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propenediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol and cyclohexanedimethanol are preferred. The aliphatic diol is preferably used as a mixture of one or two or more kinds with ethylene glycol.

The aliphatic diol is more preferably at least one of ethylene glycol, 1,2-propanediol and 1,3-propanediol, and particularly preferably at least one of ethylene glycol and 1,2-propanediol. In the case of using two kinds of the aliphatic diols to synthesize the polycondensation ester, it is preferred to use ethylene glycol and 1,2-propanediol. By using 1,2-propanediol or 1,3-propanediol, crystallization of the polycondensation ester can be prevented.

In the polycondensation ester, a diol residue derived from the diol compound used in the mixing is incorporated in the polyester as a diol component.

More specifically, the polycondensation ester preferably contains as the diol residue, at least one of an ethylene glycol residue, a 1,2-propenediol residue and a 1,3-propenediol residue, and more preferably contains an ethylene glycol residue or a 1,2-propanediol residue.

The ethylene glycol residue is preferably contained in the percentage of from 10 to 100% by mole, and more preferably from 20 to 100% by mole with respect to the aliphatic diol residue contained in the polycondensation ester.

The terminal of the polycondensation ester may be the diol or carboxylic acid as it is without being sealed (that is, the terminal of the polymer chain is —OH or $CO_2H$), or sealing of the terminal may be conducted upon further reaction with monocarboxylic acids or monoalcohols. When the terminal of the polycondensation ester is sealed, it is possible to obtain an effect that the state at an ordinary temperature is hardly changed to a solid form, which results in good handling, and a cellulose ester film having excellent humidity stability and capable of giving polarizer durability can be obtained.

The monocarboxylic acids which are used for the sealing are preferably acetic acid, propionic acid, butanoic acid, benzoic acid or the like. The monoalcohols which are used for the sealing are preferably methanol, ethanol, propanol, isopropanol, butanol, isobutanol or the like, and most preferably methanol When the carbon number of the monocarboxylic acids which are used at the terminal of the polycondensation ester is 7 or less, the loss on heating of the compound does not become large, and the surface state failure does not occur.

It is more preferred that the terminal of the polycondensation ester is a diol residue that exists as it is without being sealed or the terminal thereof is sealed with acetic acid, propionic acid or benzoic acid. It does not matter whether the both terminals of the polycondensation ester are the same or different from one another in terms of the presence of sealing.

In the case where the both terminals of the polycondensation ester are unsealed, the polycondensation ester is preferably a polyesterpolyol.

As one embodiment of the polycondensation ester, a polycondensation ester in which a carbon number of the aliphatic diol residue is from 2.5 to 8.0 and the both terminals of the polycondensation ester are unsealed is exemplified. In the case where the both terminals of the polycondensation ester are sealed, the both terminals are preferably sealed upon reaction with a monocarboxylic acid. At that time, the both terminals of the polycondensation ester are the monocarboxylic acid residues.

In the present specification, a monocarboxylic acid residue which is formed from a monocarboxylic acid of Rβ—COOH is Rβ—CO—. In the case where the both terminals of the polycondensation ester are sealed with a monocarboxylic acid, a monocarboxylic acid residue derived from the monocarboxylic acid is preferably an aliphatic monocarboxylic acid residue, more preferably an aliphatic monocarboxylic acid residue having 22 or less carbon atoms, and still more preferably an aliphatic monocarboxylic acid residue having 3 or less carbon atoms. Also, the monocarboxylic acid residue is preferably an aliphatic monocarboxylic acid residue having 2 or more carbon atoms, and particularly preferably an aliphatic monocarboxylic acid residue having 2 carbon atoms.

As one embodiment of the polycondensation ester, a polycondensation ester in which a carbon number of the aliphatic diol residue is from more than 2.5 to 7.0 and the both terminals of the polycondensation ester are sealed with a monocarboxylic acid residue is exemplified.

When the carbon number of the monocarboxylic acid residue sealing the both terminals of the polycondensation ester is 3 or less, the volatility is decreased, the loss on heating of the polycondensation ester does not become large, and it is possible to reduce the generation of process contamination and the occurrence of surface state failure.

More specifically, the monocarboxylic acid which is used for the sealing is preferably an aliphatic monocarboxylic acid, more preferably an aliphatic monocarboxylic acid having from 2 to 22 carbon atoms, still more preferably an aliphatic monocarboxylic acid having from 2 to 3 carbon atoms, and particularly preferably an aliphatic monocarboxylic acid having 2 carbon atoms.

For example, acetic acid, propionic acid, butanoic acid, benzoic acid and their derivatives are preferable; acetic acid and propionic acid are more preferable; acetic acid is most preferable.

A mixture of two or more different kinds of monocarboxylic acids may be used for terminal sealing.

It is preferable that both terminals of the polycondensation ester are sealed with acetic acid or propionic acid, and it is most preferable that the both terminals of the polycondensation ester are modified to be an acetyl ester residue (sometimes referred to as "acetyl residue") upon being sealed with acetic acid.

Specific examples J-1 to J-41 of the polycondensation ester are shown in Table 1 below, but the present invention is not limited thereto.

Here, with respect to the abbreviated expressions shown in the above-described Table 1, PA represents phthalic acid, TPA represents terephthalic acid, AA represents adipic acid, SA represents succinic acid, 2,6-NPA represents 2,6-naphthalene dicarboxylic acid, ED represents Ethanediol, PD represents Propanediol, and CHD represents Cyclohexanedimethanol.

The polycondensation ester can be produced with ease according to any conventional method, for example, according to a polyesterification, interesterification or thermal fusing condensation method of a dicarboxylic acid and a diol, or an interfacial condensation method of an acid chloride of their acid and glycols. Polycondensate esters are described in detail in Koichi Murai, "Plasticizers and their Theory and Applications" (by Miyuki Shobo, $1^{st}$ Ed., issued on Mar. 1, 1973), and they can be used in the present invention. In this invention, also usable herein are compounds described in JP-A-5-155809, JP-A-5-155810, JP-A-5-197073, JP-A-2006 259494, JP-A-7-330670, JP-A-2006-342227 and JP-A-2007-003679.

(Carbohydrate Derivative-based Plasticizer)

Further, the cellulose acylate film of the present invention preferably contains a carbohydrate derivative-based plasticizer. Incorporating therein the carbohydrate derivative-based plasticizer enables achievement of an effect that a cel-

TABLE 1

| | Dicarboxylic acid | | | Diol | | | |
|---|---|---|---|---|---|---|---|
| | Aromatic dicarboxylic acid (dc1) | Aliphatic dicarboxylic acid (dc2) | Dicarboxylic acid mol ratio (dc1/dc2) | Diol 1 (do1) | Diol 2 (do2) | Diol mol ratio (do1/do2) | Terminal |
| J-1 | TPA | SA | 45/55 | ED | PD | 45/55 | Acetyl ester group |
| J-2 | TPA | SA | 50/50 | ED | PD | 45/55 | Acetyl ester group |
| J-3 | TPA | SA | 55/45 | ED | PD | 45/55 | Acetyl ester group |
| J-4 | TPA | SA | 65/35 | ED | PD | 45/55 | Acetyl ester group |
| J-5 | TPA | SA | 55/45 | ED | PD | 25/75 | Acetyl ester group |
| J-6 | TPA | SA | 55/45 | ED | PD | 10/90 | Acetyl ester group |
| J-7 | 2,6-NPA | SA | 50/50 | ED | PD | 45/55 | Acetyl ester group |
| J-8 | 2,6-NPA | SA | 50/50 | ED | PD | 45/55 | Acetyl ester group |
| J-9 | TPA/PA | SA | 45/5/50 | ED | PD | 45/55 | Acetyl ester group |
| J-10 | TPA/PA | SA | 40/10/50 | ED | PD | 45/55 | Acetyl ester group |
| J-11 | TPA | SA/AA | 50/30/20 | ED | PD | 45/55 | Acetyl ester group |
| J-12 | TPA | SA/AA | 50/20/30 | ED | PD | 45/55 | Acetyl ester group |
| J-13 | TPA | SA | 50/50 | ED | PD | 25/75 | Acetyl ester group |
| J-14 | TPA | SA | 55/45 | ED | PD | 45/55 | Acetyl ester group |
| J-15 | TPA | SA | 55/45 | ED | CHD | 45/55 | Acetyl ester group |
| J-16 | TPA | SA | 45/55 | ED | PD | 45/55 | Hydroxyl group |
| J-17 | TPA | SA | 50/50 | ED | PD | 45/55 | Hydroxyl group |
| J-18 | TPA | SA | 55/45 | ED | PD | 45/55 | Hydroxyl group |
| J-19 | TPA | SA | 65/35 | ED | PD | 45/55 | Hydroxyl group |
| J-20 | TPA | SA | 55/45 | ED | PD | 25/75 | Hydroxyl group |
| J-21 | TPA | SA | 55/45 | ED | PD | 10/90 | Hydroxyl group |
| J-22 | 2,6-NPA | SA | 50/50 | ED | PD | 25/75 | Hydroxyl group |
| J-23 | 2,6-NPA | SA | 50/50 | ED | PD | 25/75 | Hydroxyl group |
| J-24 | 2,6-NPA | SA | 45/5/50 | ED | PD | 25/75 | Hydroxyl group |
| J-25 | 2,6-NPA | SA | 40/10/50 | ED | PD | 25/75 | Hydroxyl group |
| J-26 | TPA | SA/AA | 50/30/20 | ED | PD | 25/75 | Hydroxyl group |
| J-27 | TPA | SA/AA | 50/20/30 | ED | PD | 25/75 | Hydroxyl group |
| J-28 | TPA | SA | 50/50 | ED | PD | 25/75 | Hydroxyl group |
| J-29 | TPA | SA | 55/45 | ED | PD | 25/75 | Hydroxyl group |
| J-30 | TPA | SA | 55/45 | ED | CHD | 25/75 | Hydroxyl group |
| J-31 | TPA | SA | 55/45 | ED | PD | 45/55 | Propionyl ester group |
| J-32 | TPA | — | 100/0 | ED | PD | 50/50 | Hydroxyl group |
| J-33 | TPA | — | 100/0 | ED | PD | 40/60 | Acetylester group |
| J-34 | TPA | SA | 50/50 | ED | PD | 45/55 | Benzoyl ester group |
| J-35 | TPA | SA | 55/45 | ED | PD | 50/50 | Hydroxyl group |
| J-36 | TPA | SA | 55/45 | ED | PD | 50/50 | Acetyl ester group |
| J-37 | TPA | SA | 80/20 | ED | PD | 50/50 | Hydroxyl group |
| J-38 | TPA | SA | 80/20 | ED | PD | 50/50 | Acetyl ester group |
| J-39 | PA | AA | 10/90 | ED | None | 100/0 | Acetyl ester group |
| J-40 | PA | AA | 25/75 | ED | None | 100/0 | Acetyl ester group |
| J-41 | PA | AA | 50/50 | ED | None | 100/0 | Acetyl ester group | lulose ester film having excellent humidity stability and capable of giving polarizing plate durability can be obtained.

As the carbohydrate derivative-based plasticizer, derivatives of carbohydrates including monosaccharides or from 2 to 10 monosaccharide units are preferred.

The monosaccharide or polysaccharide by which the carbohydrate derivative-based plasticizer is preferably composed is characterized in that any of substitutable groups which are contained in the molecule thereof (for instance, a hydroxyl group, a carboxyl group, an amino group, and a mercapto group) are substituted. Examples of the structure formed by substitution include an alkyl group, an aryl group, and an acyl group. Further, an ether structure formed by substitution, an ester structure formed by a hydroxyl group substituted with an acyl group, and an amide structure or an imide structure formed by substitution with an amino group are exemplified.

Examples of the carbohydrates including the above-described monosaccharides or from 2 to 10 monosaccharide units include erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, malotriose, manninotriose, melezitose, panose, planteose, raffinose, solatriose, umbelliferose, lycotetraose, maltotetraose, stachyose, baltopentaose, belbalcose, maltohexaose, α-cyclodextrin, β-cyclodextrin, γ-cyclodextrin, δ-cyclodextrin, xylitol, and sorbitol.

Among these, ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol are preferred. Further, arabinose, xylose, glucose, fructose, mannose, galactose, maltose, cellobiose, sucrose, β-cyclodextrin, and γ-cyclodextrin are more preferred, and xylose, glucose, fructose, mannose, galactose, maltose, cellobiose, sucrose, xylitol, and sorbitol are particularly preferred.

Examples of the substituents for the carbohydrate derivative-based plasticizer include an alkyl group (preferably an alkyl group having 1 to 22 carbon atoms, more preferably 1 to 12 carbon atoms, and particularly preferably 1 to 8 carbon atoms, for example, a methyl group, an ethyl group, a propyl group, a hydroxyethyl group, a hydroxypropyl group, a 2-cyanoethyl group and a benzyl group), an aryl group (preferably an aryl group having 6 to 24 carbon atoms, more preferably 6 to 18 carbon atoms, and particularly preferably 6 to 12 carbon atoms, for example, a phenyl group and a naphthyl group), and an acyl group (preferably an acyl group having 1 to 22 carbon atoms, more preferably 2 to 12 carbon atoms, and particularly preferably 2 to 8 carbon atoms, for example, acetyl, propionyl, butyryl, pentanoyl, hexanoyl, octanoyl, benzoyl, toluoyl, phthalyl and naphthoyl). Further, preferable examples of the structure formed by substitution with an amino group include an amido structure (preferably an amide having 1 to 22 carbon atoms, more preferably 2 to 12 carbon atoms, and particularly preferably 2 to 8 carbon atoms, for example, formamide, acetamide and the like), and an imido structure (preferably an imide having 4 to 22 carbon atoms, more preferably 4 to 12 carbon atoms, and particularly preferably 4 to 8 carbon atoms, such as succinimide and phthalimide).

Among these, an alkyl group, an aryl group or an acyl group is more preferable, an acyl group is particularly preferably.

Preferable examples of the carbohydrate derivative-based plasticizer include the followings. However, the carbohydrate derivative-based plasticizer that can be used in the present invention is not limited thereto.

Xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. Among these, xylose tetraacetate, glucose pentaacetate, fructose pentaacetate, mannose pentaacetate, galactose pentaacetate, maltose octacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate are more preferred. Especially, maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate are still more preferred.

The carbohydrate derivative-based plasticizer preferably has a pyranose structure or a furanose structure.

Of the carbohydrate derivatives used in the present invention, the following compounds are particularly preferred. However, the carbohydrate derivatives which can be used in the present invention are not limited to these compounds.

In the following structure, each of Rs independently represents an arbitrary substituent. A plurality of Rs may be the same or different from one another.

In the following Tables 2 to 5, the carbohydrate derivatives are those of which hydroxyl groups (each of Rs is a hydrogen atom) are acylated with 2 kinds of acylating agents. One of the Rs introduced by the 2 kinds of acylating agents is indicated as "Substituent 1", while another of the Rs is indicated as "Substituent 2". The substitution degree represents the number of either of these substituents in the total hydroxyl groups.

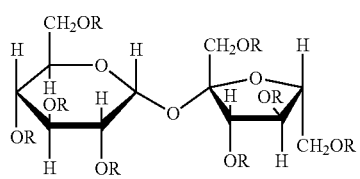

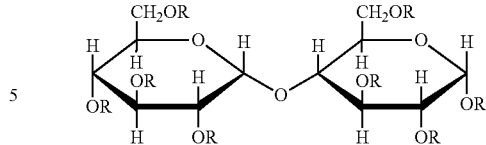

TABLE 2

| Compound | Substituent 1 Kind | Substitution degree | Substituent 2 Kind | Substitution degree | Molecular weight |
|---|---|---|---|---|---|
| K-101 | Acetyl | 7 | Benzyl | 1 | 727 |
| K-102 | Acetyl | 6 | Benzyl | 2 | 775 |
| K-103 | Acetyl | 7 | Benzoyl | 1 | 741 |
| K-104 | Acetyl | 6 | Benzoyl | 2 | 802 |
| K-105 | Benzyl | 2 | None | 0 | 523 |
| K-106 | Benzyl | 3 | None | 0 | 613 |
| K-107 | Benzyl | 4 | None | 0 | 702 |
| K-108 | Acetyl | 7 | Phenyl acetyl | 1 | 771 |
| K-109 | Acetyl | 6 | Phenyl acetyl | 2 | 847 |
| K-110 | Benzoyl | 1 | None | 0 | 446 |
| K-111 | Benzoyl | 2 | None | 0 | 551 |
| K-112 | Benzoyl | 3 | None | 0 | 655 |
| K-113 | Benzoyl | 4 | None | 0 | 759 |
| K-114 | Benzoyl | 5 | None | 0 | 863 |
| K-115 | Benzoyl | 6 | None | 0 | 967 |
| K-116 | Benzoyl | 7 | None | 0 | 1071 |
| K-117 | Benzoyl | 8 | None | 0 | 1175 |

TABLE 4

| Compound | Substituent 1 Kind | Substitution degree | Substituent 2 Kind | Substitution degree | Molecular weight |
|---|---|---|---|---|---|
| K-301 | Acetyl | 6 | Benzoyl | 2 | 803 |
| K-302 | Acetyl | 6 | Benzyl | 2 | 775 |
| K-303 | Acetyl | 6 | Phenyl acetyl | 2 | 831 |
| K-304 | Benzoyl | 2 | None | 0 | 551 |
| K-305 | Benzyl | 2 | None | 0 | 522 |
| K-306 | Phenyl acetyl | 2 | None | 0 | 579 |

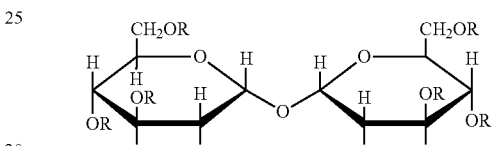

TABLE 5

| Compound | Substituent 1 Kind | Substitution degree | Substituent 2 Kind | Substitution degree | Molecular weight |
|---|---|---|---|---|---|
| K-401 | Acetyl | 6 | Benzoyl | 2 | 803 |
| K-402 | Acetyl | 6 | Benzyl | 2 | 775 |
| K-403 | Acetyl | 6 | Phenyl acetyl | 2 | 831 |
| K-404 | Benzoyl | 2 | None | 0 | 551 |
| K-405 | Benzyl | 2 | None | 0 | 523 |
| K-406 | Phenyl ester | 2 | None | 0 | 579 |

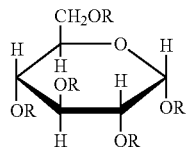

TABLE 3

| Compound | Substituent 1 Kind | Substitution degree | Substituent 2 Kind | Substitution degree | Molecular weight |
|---|---|---|---|---|---|
| K-201 | Acetyl | 4 | Benzoyl | 1 | 468 |
| K-202 | Acetyl | 3 | Benzoyl | 2 | 514 |
| K-203 | Acetyl | 2 | Benzoyl | 3 | 577 |
| K-204 | Acetyl | 4 | Benzyl | 1 | 454 |
| K-205 | Acetyl | 3 | Benzyl | 2 | 489 |
| K-206 | Acetyl | 2 | Benzyl | 3 | 535 |
| K-207 | Acetyl | 4 | Phenyl acetyl | 1 | 466 |
| K-208 | Acetyl | 3 | Phenyl acetyl | 2 | 543 |
| K-209 | Acetyl | 2 | Phenyl acetyl | 3 | 619 |
| K-210 | Phenyl acetyl | 1 | None | 0 | 298 |
| K-211 | Phenyl acetyl | 2 | None | 0 | 416 |
| K-212 | Phenyl acetyl | 3 | None | 0 | 535 |
| K-213 | Phenyl acetyl | 4 | None | 0 | 654 |
| K-214 | Acetyl | 1 | Benzoyl | 4 | 639 |
| K-215 | Acetyl | 0 | Benzoyl | 5 | 701 |

The carbohydrate derivative is available as a marketed product from Tokyo Chemical Industry Co., Ltd., Sigma-Aldrich Corporation and the like. Alternatively, the carbohydrate derivative can be readily synthesized by subjecting a commercially available carbohydrate to a known esterification reaction (for example, a method described in JP-A-8-245678).

The content of the plasticizer is preferably from 1 to 20% by mass with respect to 100 parts by mass of the cellulose acylate. When the content is 1% by mass or greater, an effect of improvement in polarizer durability can be easily achieved. While, on the other hand, when the content is 20% by mass or less, bleeding is suppressed. The content is more preferably from 2 to 15% by mass, and particularly preferably from 5 to 15% by mass.

The timing of addition of the plasticizers to the cellulose acylate film is not particularly limited, as long as it is added at the time of film production. For example, it may be added at the time when the cellulose acylate is synthesized, or alternatively it may be mixed with the cellulose acylate at the time of preparing a dope.

(Other Additives)

Known antioxidants, ultraviolet absorbers, matting agents and the like may be added as other additives.

These are described below.

(Antioxidant)

In the present invention, it is possible to add to a cellulose acylate solution a known antioxidant, for example, a phenol-based or hydroquinone-based antioxidant, such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone and pentaerythrityl-tetrakis[3-(3,5-di-tert-butyl-4-hydroxyphenyl)propionate]. Further, it is preferable to add a phosphorus-based antioxidant, such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol diphosphite, and bis(2,4-di-tert-butylphenyl)pentaerythritol diphosphite. As for the content of the antioxidant, the antioxidant is preferably added in the proportion of from 0.05 to 5.0 parts by mass with respect to 100 parts by mass of the cellulosic resin.

(Ultraviolet Absorber)

In the present invention, an ultraviolet absorber may be added to the cellulose acylate solution from the viewpoint of preventing deterioration of a polarizing plate, a liquid crystal or the like. As the ultraviolet absorber, it is preferable to use those which have excellent absorption capacity of ultraviolet at the wavelength of 370 nm or less and further which exhibit a low absorption of visible light having the wavelength of 400 nm or longer from the viewpoint of good properties for the liquid crystal display. Examples of the ultraviolet absorber which is preferably used in the present invention include a hindered phenol-based compound, a hydroxybenzophenone-based compound, a benzotriazole-based compound, a salicylic acid ester-based compound, a benzophenone-based compound, a cyano acrylate-based compound and a nickel complex-based compound.

Examples of the hindered phenol-based compound include 2,6-di-tert-butyl-p-cresol, pentaerythrityl-tetrakis[3-(3,5-di-tert-butyl-4-hydroxyphenyl) propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris(3,5-di-tert-butyl-4-hydroxybenzyl) isocyanurate.

Examples of the benzotriazole-based compound include 2-(2'-hydroxy-5'-methylphenyl)benzotriazole, 2,2-methylenebis[4-(1,1,3,3-tetramethylbutyl)-6-(2H-benzotriazole-2-yl)phenol], (2,4-bis-(n-octylthio)-6-(4-hydroxy-3,5-di-tert-butylanilino)-1,3,5-triazine, triethyleneglycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl) propionate].

The addition amount of the ultraviolet absorber is preferably from 1 ppm to 1.0%, and more preferably from 10 to 1000 ppm, in terms of mass proportion in the entire optical film.

(Matting Agent)

A matting agent may be added to the cellulose acylate film of the present invention from the viewpoint of film lubricity (slipping property) and stable production. The matting agent may be either a matting agent composed of an inorganic compound or a matting agent composed of an organic compound.

Preferable examples of the matting agent composed of the inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin-antimony oxide, calcium carbonate, talc, clay, calcined kaolin, calcium phosphate and the like. Further, silicon-containing inorganic compounds and zirconium oxide are more preferred. Silicon dioxide is particularly preferred because it is capable of reducing haze of the cellulose acylate film.

As fine particles of silicon dioxide, for example, commercial products which have trade names such as Aerosil R972, R974, R812, 200, 300, R202, OX50, TT600 (all by Nippon Aerosil) are usable. As fine particles of zirconium oxide, for example, commercial products which have trade names such as Aerosil R976 and R811 (both by Nippon Aerosil) are usable.

Preferable examples of the matting agent composed of the organic compound include polymers such as silicone resins, fluororesins, acrylic resins and the like. Above all, silicone resins are more preferred. Of the silicone resins, those having a three-dimensional network structure are particularly preferred. For example, it is possible to use commercially available products having trade names of Tospearl 103, Tospearl 105, Tospearl 108, Tospearl 120, Tospearl 145, Tospearl 3120, Tospearl 240 (all manufactured by Toshiba Silicone Co., Ltd.) and the like.

When the matting agent is added to the cellulose acylate solution, any method may be used with no problem, as long as a desired cellulose acylate solution can be obtained by the any method. For example, the additive may be added in the stage where a cellulose acylate is mixed with a solvent; or after preparing a mixture solution from a cellulose acylate and a solvent, the additive may be added thereto.

Further, the additive may be added to and mixed with a dope just before casting of the dope. This is a what is called "just before" addition method, and the mixing is conducted by screw kneading provided on-line. Specifically, a static mixer like an in-line mixer is preferred. As the in-line mixer, for example, a static mixer, SWJ (Toray's static intratubular mixer, Hi-Mixer, manufactured by Toray Engineering Co., Ltd.) and the like are preferred.

Regarding the in-line addition, JP-A-2003-053752 describes a method for producing a cellulose acylate film in which, for the purpose of preventing concentration unevenness and particle aggregation, the distance L between a nozzle tip through which an additive liquid having a composition different from that of a main raw material dope is added and a start end of the in-line mixer is controlled to be at most 5 times the inner diameter d of the main raw material-feeding pipe, thereby preventing concentration unevenness and aggregation of matting particles and the like. JP-A-2003-053752 discloses a more preferred embodiment, in which the distance (L) between the nozzle tip opening through which the additive liquid having a composition different from that of the main raw material dope is added and the start end of the in-line mixer is controlled to be at most 10 times the inner diameter (d) of the feeding nozzle tip opening, and the in-line mixer is a static non-stirring tubular mixer or a dynamic stirring tubular mixer. More specifically, JP-A-2003-053752 discloses that the flow rate of the cellulose acylate film main raw material dope/in-line additive liquid is from 10/1 to 500/

1, and preferably from 50/1 to 200/1. JP-A-2003-014933 discloses a method of providing a phase difference film which is free from a trouble of additive bleeding and a trouble of interlayer peeling and which has good lubricity and excellent transparency; and regarding the method of adding additives to the film, the patent reference discloses that the additive may be added to a dissolving tank, or the additive or a solution or dispersion of the additive may be added to the dope during solution sending in the process of from the dissolving tank to a co-casting die, and further discloses that in the latter case, a mixing means such as a static mixer is provided therein for the purpose of enhancing the mixing efficiency.

The matting agent does not increase haze of the film, unless a large amount of the matting agent is added to the film. In fact, when the film containing a suitable amount of a matting agent is used in LCD, the film is free from disadvantages of contract reduction and bright spot formation. Unless it is too small, the matting agent in the film can realize both creaking resistance and scratch resistance of the film. From these viewpoints, the matting agent is preferably incorporated in the proportion of from 0.05 to 1.0% by mass with respect to the cellulose acylate.

The total of component percentages of cellulose acylate, a plasticizer and other additives with respect to the total solid content is 100% by mass.

<Constitution and Physical Properties of Cellulose Acylate Film>
(Layer Structure of Film)

The cellulose acylate film of the present invention may be either a single layer or a layered product having at least two layers.

In the case where the cellulose acylate film of the present invention is the layered product having at least two layers, a double-layered structure or a three-layered structure is preferable, and a three-layered structure is more preferable. In the case of the three-layered structure, the three-layered structure preferably has a layer which is brought into contact with the metal support (hereinafter, also referred to as a support surface or a skin B layer), an airinterface layer disposed at the side opposite to the metal support (hereinafter, also referred to as an airface or a skin A layer), and a core layer (hereinafter, also referred to as a base layer) which is one layer sandwiched between the two layers. That is to say, the film of the present invention preferably has the three-layered structure formed of skin B layer/core layer/skin A layer. This three-layered structure can be formed by the means of film formation with solution.

It is noted that generically both the skin A layer and the skin B layer are also referred to as a skin layer (or a surface layer).

As for the cellulose acylate film of the present invention, the acyl substitution degree of the cellulose acylate in each layer thereof may be uniform, or alternatively plural kinds of cellulose acylate may be incorporated as a mixture thereof in the same layer. However, it is preferable from the viewpoint of adjusting optical properties that the acyl substitution degree of the cellulose acylate in each layer is entirely constant. In the case where the cellulose acylate film of the present invention is a three-layered structure, it is preferable from the viewpoint of production cost to use cellulose acylates having the same acyl substitution degree as for the cellulose acrylates which are incorporated in surface layers on the two sides.

(Elastic Modulus)

The film of the present invention exhibits practically-sufficient elastic modulus. The range of the elastic modulus, although it is not particularly limited, is preferably from 1.0 GPa to 5.0 GPa, and more preferably from 2.0 GPa to 4.5 GPa, from the viewpoint of production suitability and handling properties. The compound represented by Formula (I) of the present invention acts such that the film is hydrophobized by addition of the compound to a cellulose acylate, thereby improving elastic modulus. In this point, the present invention also has an advantage.

(Photoelastic Coefficient)

The absolute value of photoelastic coefficient of the film of the present invention is preferably $8.0 \times 10^{-12}$ m$^2$/N or less, more preferably $6.0 \times 10^{-12}$ m$^2$/N or less, and still more preferably $5.0 \times 10^{-12}$ m$^2$/N or less. Lessening the photoelastic coefficient of the resin film enables suppression of generation of unevenness under the conditions of high temperature and high humidity upon mounting of the resin film into a liquid crystal display as a polarizing plate protective film. The photoelastic coefficient is measured and calculated in accordance with the following method, unless it is explicitly stated otherwise.

The lower limit of the photoelastic coefficient is not particularly limited. However, it is practical to be $0.1 \times 10^{-12}$ m$^2$/N or more.

A film is cut into a specimen of 3.5 cm×12 cm and Re is measured under each load of non-load, 250 g, 500 g, 1000 g and 1500 g using an ellipsometer (M 150 [trade name], manufactured by JASCO Corporation), and by calculation based on the slope of a straight line of Re change to stress, the photoelastic coefficient is measured.

(Moisture Content)

The moisture content of the resin film can be evaluated by measurement of equilibrium moisture content under the constant temperature and humidity. The equilibrium moisture content is obtained by the following method. That is, the moisture content of a sample which has reached equilibrium after leaving it for 24 hours at the above-described temperature and humidity is measured in accordance with Karl Fischer Method, and the obtained moisture content (g) is divided by the sample mass (g) to obtain the equilibrium moisture content.

The moisture content of the film of the present invention under the conditions of 25° C. and relative humidity of 80% is preferably 5% by mass or less, more preferably 4% by mass or less, and still more preferably less than 3% by mass. Lessening the moisture content of the film enables suppression of generation of unevenness under the conditions of high temperature and high humidity upon mounting of the resin film into a liquid crystal display as a polarizing plate protective film. The lower limit of the moisture content is not particularly limited. However, it is practical to be 0.1% by mass or greater.

(Water-vapour Transmission Ratio)

The water-vapour transmission ratio of the resin film can be measured and evaluated by the following method. That is, the mass of water-vapour which passes through the sample for 24 hours in the atmosphere of temperature: 60° C. and relative humidity: 95% RH is measured in accordance with the water-vapour transmission ratio test (cup method) prescribed in JIS Z0208, and the obtained value is converted to a value per m$^2$ of the sample area to evaluate the water-vapour transmission ratio.

The water-vapour transmission ratio of the resin film of the present invention is preferably from 500 to 2000 g/m$^2$·day, more preferably from 900 to 1300 g/m$^2$·day, and particularly preferably from 1000 to 1200 g/m$^2$·day.

(Haze)

The cellulose acylate film of the present invention which contains at least one compound represented by Formula (I) or (II) enables suppression of haze associated with precipitation or sublimation of additives during film production. The cellulose acylate film of the present invention may have a haze of preferably 1.1% or less, more preferably 1.0% or less, even more preferably 0.7% or less, most preferably 0.5% or less. When the haze is lowered to the above-described upper limit or less, the cellulose acylate film has advantages in that transparency of the film is more increased and thus the film becomes more usable as an optical film. The haze is measured and calculated in accordance with the method used in Examples described below, unless it is explicitly stated otherwise. The lower limit of the haze is not particularly limited. However, it is practical to be 0.001% by mass or greater.

(Film Thickness)

The average film thickness of the present invention is preferably from 10 to 100 μm, more preferably from 15 to 80 μm, and still more preferably from 20 to 70 μm. Setting the average film thickness to 20 μm or greater is preferable, because handling properties during production of a web film are improved. While, on the other hand, when the average film thickness is set to 70 μm or less, the response to humidity change becomes easy and thus maintenance of the optical characteristics becomes easy.

Further, in the case where the cellulose acylate film of the present invention has a multi-layered structure of three or more multi-layers, the film thickness of the above-described core layer is preferably from 3 to 70 μm, and more preferably from 5 to 60 μm. In the case where the film of the present invention has a multi-layered structure of three- or more multi-layers, each of the film thicknesses of the surface layers (skin layer A and skin layer B) on both sides of film is more preferably from 0.5 to 20 μm, particularly preferably from 0.5 to 10 μm, and most preferably from 0.5 to 3 μm.

(Film Width)

The film width of the cellulose acylate film of the present invention is preferably from 700 to 3000 mm, more preferably from 1000 to 2800 mm, and particularly preferably from 1300 to 2500 mm.

<5 Production Method of Cellulose Acylate Film>

The cellulose acylate film of the present invention is preferably produced by a solvent-casting method. Examples of production of cellulose acylate film using a solvent-casting method are given in U.S. Pat. Nos. 2,336,310, 2,367,603, 2,492,078, 2,492,977, 2,492,978, 2,607,704, 2,739,069 and 2,739,070, British Patents 640731, 736892, JP-B-45-4554, JP-B-49-5614, and JP-A-60-176834, JP-A-60-203430, JP-A-62-115035, are referred to herein. The cellulose acylate film may be stretched. Regarding the method and condition for stretching treatment, for example, referred to are JP-A-62-15035, JP-A-4-152125, JP-A-4-284211, JP-A-4-298310, JP-A-11-48271.

(Casting Methods)

Solution casting methods may include a method for uniformly extruding a prepared dope from a pressure die onto a metal support, a doctor blade method for adjusting with a blade, the film thickness of a dope once cast on a metal support, a reverse roll coater method for adjusting it with a reverse rotating roll, and the like, but the method of using a pressure die is preferred. The pressure die includes a coat hanger type or a T die type, and any of them may be preferably used. In addition to these methods exemplified herein, various methods of film production by casting a cellulose triacylate solution, which are known in the prior art, may be employed. When each of conditions is set in consideration of the difference in the boiling points of solvents used, the same effects as the contents described in each publication can be obtained.

Co-Casting

In formation of the cellulose acylate film of the present invention, a multi-layer casting method such as a co-casting method, a sequential casting method and a coating method is preferably used. Especially, use of a simultaneous co-casting method is particularly preferred from the viewpoints of stable production and production cost.

Figure 2:
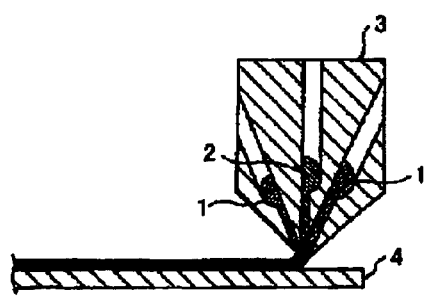
{FIG. 2}

In case where the film is produced according to a co-casting method and a sequential casting method, first a cellulose acetate solution (dope) for each layer is prepared. The co-casting method (multilayer simultaneous casting method) is a casting method in which individual layers are simultaneously cast by simultaneously extruding co-casting dopes onto a casting support (band or dram) from a casting Giesser through which the individual casting dopes for intended layers (the number of the layers may be three or more) are simultaneously extruded via different slits and the like, and then at a suitable time, the film formed on the support is peeled away and dried. In FIG. 2, the cross-sectional view shows a state in which casting is performed by simultaneously extruding three layers formed of dope 1 for two surface layers and dope 2 for core layer on casting support 4 using co-casting Giesser 3.

The sequential casting method is a casting method in which first a casting dope for first layer is extruded out and cast onto a casting support through a casting Giesser, then after it is dried or not dried, a casting dope for second layer is extruded through the casting Giesser and cast onto it, and if needed, three or more layers are sequentially formed by casting and laminating dopes in the same manner as the above, and then at a suitable time, the resulting laminate is peeled away from the support and dried to form at film. The coating method is generally a method in which a film for a core layer is formed by means of film formation with solution, then a coating solution for a surface layer is prepared, and then using a suitable coater, the coating solution is applied onto the film first on one surface thereof and next on the other surface thereof, or simultaneously on both surfaces thereof, and dried to form a multi-layered film.

As the endlessly running metal support for use in production of the cellulose acylate film, it is possible to use a dram the surface of which is mirror-finished by chromium plating, or a stainless belt (may be called as a band) the surface of which is mirror-finished by surface polish. One or at least two pressure dies may be used by arranging it above the metal support. Preferably, one or two pressure dies are arranged.

In case where two or more pressure dies are arranged, a casting amount of the dope may be divided into portions which are suitable for the individual dies; or the casting dope may be fed to the die at a suitable proportion from a plurality of precision metering gear pumps. The temperature of the dope (resin solution) used for casting is preferably from −10 to 55° C., and more preferably from 25 to 50° C. In this case, the solution temperature may be the same throughout the entire process, or may be different in different stages of the process. In case where the temperatures are different in different stages, it is no problem as long as the dope has a desired temperature just before casting.

Further, the material of the metal support, although it is not particularly limited, is preferably made of SUS (for example, SUS 316).

(Peeling)

The method of producing the cellulose acylate film of the present invention preferably includes a process of peeling off the above-described dope film from the metal support. In the production method of the cellulose acylate film, the method of peeling off it is not particularly limited, and peeling property can be improved by any of methods known for peel-off.
(Stretching Process)

The method of producing the cellulose acylate film of the present invention preferably includes a stretching process after film production. The stretching direction of the cellulose acylate film is preferable in any of a film conveying direction (MD direction) and an orthogonal direction (TD direction) to the conveying direction. However, the TD direction is particularly preferred from the viewpoint of the subsequent polarizing plat-manufacturing process using the above film.

A method of stretching the film in the TD direction is described in, for example, JP-A-62-115035, JP-A-4-152125, JP-A-4-284211, JP-A-4-298310, JP-A-1-48271 and the like. In the case of stretching in the MD direction, the film is stretched when the film winding speed is set to be faster than the film peeling-off speed, for example, by adjusting a speed of the film-conveying roller. In the case of transverse stretching, the film may be stretched by conveying the film while holding the width of the film with a tenter, and extending the width of the tenter gradually. After drying the film, the film may be also stretched by using a stretching machine (preferably uniaxial stretching by using a long stretching machine).

In case where the cellulose acylate film is used as a protective film for a polarizer, the transmission axis of the polarizer and the in-plane slow axis of the resin film of the present invention are required to be arranged parallel to one another in order to suppress the light leakage when viewed from oblique directions to the polarizing plate. The transmission axis of the roll film-shaped polarizer that is produced continuously is generally parallel to the width direction of the roll film, and therefore, in order to continuously sticking the roll film-shaped polarizing element together with a protective film composed of the roll film-shaped cellulose acylate film, the in-plane slow axis of the roll film-shaped protective film is required to be parallel to the width direction of the film. Accordingly, the film is preferably stretched to a larger extent in the width direction. The stretching treatment may be conducted during the course of the film production process, or the original film obtained by rewinding the produced film may be subjected to a stretching treatment.

The stretching in the TD direction is preferably from 5 to 100%, more preferably from 5 to 80%, and particularly preferably from 5 to 40%. The stretching treatment may be conducted during the course of the film production process, or the original film obtained by rewinding the produced film may be subjected to a stretching treatment. In the former case, stretching may be conducted in the condition where a certain amount of a residual solvent is contained, and when the residual solvent amount, i.e., (mass of residual volatile substance/mass of film after heat treatment)×100%, is from 0.05 to 50%, the stretching is preferably conducted. It is particularly preferable to conduct the stretching of from 5 to 80% in the condition where the residual solvent amount is from 0.05 to 5%.
(Drying)

It is preferable from the viewpoint of enhancing the retardation that the method of producing the cellulose acylate film of the present invention includes a step of drying the cellulose acylate film and a step of stretching the thus dried resin film of the present invention at a temperature which is equal to or higher than the glass transition temperature (Tg)−10° C.

Drying of the dope provided on a metal support that is included in the production of the cellulose acylate film of the present invention generally includes: a method of blowing a hot air from a surface side of the metal support (dram or belt), that is to say, from the surface of a web provided on the metal support; a method of blowing a hot air from a back side of the dram or belt; a back-side liquid heat transfer method in which a temperature-modulated liquid is brought into contact with the back side opposite to the casting side of the dram or belt, thereby heating the dram or belt through heat transfer to control a surface temperature; and the like. Among these, the back-side liquid heat transfer method is preferred. The surface temperature of the metal support before casting is conducted is not particularly limited as long as it is not higher than the boiling point of a solvent which is used for a dope. However, in order to promote drying or to make the dope lose fluidity on the metal support, the surface temperature is preferably set to a temperature which is from 1 to 10° C. lower than the boiling point of the solvent having the lowest boiling point among the solvents used for the dope. However, this shall not apply in the case where the casting dope is cooled and then peeled off without drying.

The adjustment of the film thickness may be achieved by adjusting a concentration of the solid contained in the dope, a slit space of the die nozzle, an extrusion pressure from a die, a speed of the metal support or the like so as to be a desired thickness.

The thus-obtained cellulose acylate film is preferably wound at the degree of from 100 to 10000 m, more preferably from 500 to 7000 m, and still more preferably from 1000 to 6000 m in length per roll. At the time of winding, at least one end thereof is preferably subjected to knurling. The width of knurling is preferably from 3 mm to 50 mm and more preferably from 5 mm to 30 mm. The height thereof is preferably from 0.5 μm to 500 μm and more preferably from 1 rpm to 200 μm. This may be either one-way press or two-way press.

Since reduction in contrast and tingeing in an oblique direction generally became remarkable in the large screen displays, the above-described cellulose acylate film is especially suitable for use in such large screen liquid crystal display. When the film is used as an optical compensation film for a large screen liquid crystal display, molding the film so as to be, for example, 1470 mm or more in width is preferred. Further, the aspect of the polarizing plate protective film of the present invention includes a film piece that is cut to a size capable of being mounted as it is in a liquid crystal display, as well as a film that is manufactured in a long shape by continuous production and wound in a roll shape. The polarizing plate protective film of the latter aspect is stored or conveyed as it is, and is used by cutting it to a desired size when the film is mounted in a liquid crystal display, or when the film and a polarizer or the like are stuck together in practice. Alternatively, the polarizing plate protective film is used by cutting it to a desired size when the film is mounted in a liquid crystal display in practice after sticking the film in a long shape as it is with a polarizer composed of a polyvinyl alcohol film or the like manufactured similarly in a long shape. As an aspect of the optical compensation film which is wound in a roll shape, an aspect of a film which is wound in a roll shape and has a roll length of 2500 m or more, is exemplified.
<<Polarizing Plate>>

The polarizing plate of the present invention includes at least a polarizer and cellulose acylate film of the present invention.

The polarizing plate of the present invention preferably includes a polarizer and the film of the present invention provided on one side or both sides of the polarizer. Examples of the polarizer include an iodine-type polarizer, a dye-type polarizer using a dichroic dye and a polyene-type polarizer. Ordinarily the iodine-type polarizing film and the dye-type polarizing film may be produced using a polyvinyl alcohol film. When the cellulose acylate film of the present invention is used as a polarizing plate protective film, the production method of the polarizing plate is not particularly limited and may be produced in accordance with an ordinary method. There is a method of subjecting the obtained cellulose acylate film to an alkali treatment and besides preparing a polarizer by immersing a polyvinyl alcohol film in an iodine solution and stretching the film, and then sticking the thus-treated cellulose acylate film and both sides of the polarizer together with a completely-saponified polyvinyl alcohol solution. In place of the alkali treatment, an easy adhesion processing as described in JP-A-6-94915 and JP-A-6-118232 may be used. Examples of the adhesive that is used for sticking the processed surface of the protective film and both sides of polarize together include polyvinyl alcohol-type adhesives such as polyvinyl alcohol and polyvinyl butyral, and vinyl-type latexes derived from butyl acrylate or the like.

The cellulose acylate film of the present invention and the polarizer are preferably stuck together such that a transmission axis of the polarizer and a slow axis of the cellulose acylate film of the present invention are substantially bisected at right angles. It is preferable that a transmission axis of the polarizer and a slow axis of the cellulose acylate film of the present invention in the liquid crystal display of the present invention are substantially bisected at right angles. Here, the expression "substantially bisected at right angles" means that the direction of principal refractive index nx of the cellulose acylate film of the present invention and the direction of the transmission axis of the polarizer are crossed at the angle of 90°±10°, and they are crossed preferably at the angle of 90°±5° and more preferably at the angle of 90°±1°. Setting the angle to the above-described range enables further reduction in light leakage under the condition of polarizing plate cross nicol.

The aspect of the polarizing plate of the present invention includes a film piece that is cut to a size capable of being mounted as it is in a liquid crystal display, as well as a film that is manufactured in a long shape by continuous production and wound in a roll shape (for example, an aspect having the roll length of 2500 m or longer and an aspect having the roll length of 3900 m or longer). When it is intended for the large-screen liquid crystal display, the width of the polarizing plate is preferably set to 1470 mm or longer. The specific configuration of the polarizing plate of the present invention is not particularly limited, and known configuration may be used. For example, the configuration shown in FIG. 6 of JP-A-2008-262161 may be used.

<<Liquid Crystal Display>>

The liquid crystal display of the present invention includes a liquid crystal cell and the polarizing plate of the present invention.

The liquid crystal display of the present invention is preferably a liquid crystal display including a liquid crystal cell and a pair of the polarizing plates of the present invention disposed at both sides of the liquid crystal cell, the liquid crystal display being an IPS mode, an OCB mode or a VA mode wherein at least one of the polarizing plates is the polarizing plate of the present invention. An internal configuration of a typical liquid crystal display is shown in FIG. 1. The specific configuration of the liquid crystal display of the present invention is not particularly limited, and known configuration may be used. Further, the configuration shown in FIG. 2 of JP-A-2008-262161 may be preferably used.

EXAMPLES

The present invention will be described in more detail based on the following examples, but the invention is not intended to be limited thereto.

Synthesis Example

Synthesis Example 1

Synthesis of A-1

In a 300 mL of three-necked flask equipped with a mechanical stirrer, a thermometer, a condenser tube, and a dropping funnel, 54 g of p-cresol, 5.9 g of activated earth, and 0.07 g of oxalic acid were weighed, and then 104.1 g of styrene was added over 6 hours while stirring at 90° C. under a nitrogen stream, and then stirred at 90° C. for 1 hour. The reaction liquid, after cooling it back down to room temperature, was diluted with 1 liter of ethyl acetate, and then the organic layer was washed with water and a saturated saline. After drying the obtained organic layer with magnesium sulfate, a brown oily material was obtained by concentration. By purifying the brown oily material using a silica gel column (hexane/ethyl acetate-10/1 (volume ratio)), and then drying in a vacuum the obtained colorless oily material at 80° C. for 2 hours, Exemplified compound A-1 of the target was obtained as a colorless oily material (33.0 g).

Synthesis Example 2

Synthesis of A-2

Exemplified compound A-2 was obtained as a colorless oily material (21.0 g) in the same manner as Synthesis Example 1, except that p-cresol in Synthesis Example 1 was changed to 75 g of p-tert-butyl phenol.

Synthesis Example 3

Synthesis of A-3

Exemplified compound A-3 was obtained as a colorless oily material (24.0 g) in the same manner as Synthesis Example 1, except that p-cresol in Synthesis Example 1 was changed to 103 g of p-tert-octyl phenol.

Synthesis Example 4

Synthesis of A-4

Exemplified compound A-4 was obtained as a white amorphous solid (25.4 g) in the same manner as Synthesis Example 1, except that p-cresol in Synthesis Example 1 was changed to 88 g of p-cyclohexyl phenol.

Synthesis Example 5

Synthesis of A-5

Exemplified compound A-5 was obtained as a colorless oily material (36.0 g) in the same manner as Synthesis Example 1, except that p-cresol in Synthesis Example 1 was changed to 117 g of p-decyl phenol.

Synthesis Example 6

Synthesis of A-7

Exemplified compound A-7 was obtained as a yellow oily material (12 g) in the same manner as Synthesis Example 1, except that styrene in Synthesis Example 1 was changed to 118 g of β-methyl styrene.

Synthesis Example 7

Synthesis of A-8

Exemplified compound A-8 was obtained as a yellow oily material (11 g) in the same manner as Synthesis Example 1, except that in Synthesis Example 1, p-cresol was changed to 103 g of p-octyl phenol and the addition amount of styrene was changed to 27 g.

Synthesis Example 8

Synthesis of A-9

Exemplified compound A-9 was obtained as a colorless oily material (31 g) in the same manner as Synthesis Example 1, except that p-cresol in Synthesis Example 1 was changed to 61 g of 2,6-dimethyl phenol Exemplified compounds A-6 and A-19 were also synthesized in accordance with the above-described methods or known methods.

Synthesis Example 9

Synthesis of B-1

In a 500 mL of three-necked flask equipped with a mechanical stirrer, a thermometer, a condenser tube, and a dropping funnel, 122 g of 2,6-dimethyl phenol, 5.6 g of activated earth, and 0.06 g of oxalic acid were weighed, and then 79.1 g of 1,4-diisopropenylbenzene was added over 6 hours while stirring at 80° C. under a nitrogen stream, and then stirred at 80° C. for 1 hour. By purifying the obtained brown reaction mixture using a silica gel column (hexane/ethyl acetate=4/1), Exemplified compound B-1 of the target was obtained as a white crystal (29 g).

Synthesis Example 10

Synthesis of B-2

In a 500 mL of three-necked flask equipped with a mechanical stirrer, a thermometer, a condenser tube, and a dropping funnel, 122 g of 2,6-dimethyl phenol, 5.6 g of activated earth, and 0.06 g of oxalic acid were weighed, and then 79.1 g of 1,3-diisopropenylbenzene was added over 6 hours while stirring at 80° C. under a nitrogen stream, and then stirred at 80° C. for 1 hour. By purifying the obtained brown reaction mixture using a silica gel column (hexane/ethyl acetate=4/1 (volume ratio)), Exemplified compound B-2 of the target was obtained as a pale yellow oily material (27 g).

Synthesis Example 11

Synthesis of B-3

Exemplified compound B-3 was obtained as a white powder (12 g) in the same manner as Synthesis Example 9, except that 2,6-dimethyl phenol in Synthesis Example 9 was changed to an equimolar 2,6-dicyclohexyl phenol.

Synthesis Example 12

Synthesis of B-4

Exemplified compound B-4 was obtained as a white powder (11 g) in the same manner as Synthesis Example 9, except that 2,6-dimethyl phenol in Synthesis Example 9 was changed to an equimolar 2,6-diisopropyl phenol.

Synthesis Example 14

Synthesis of B-5

Exemplified compound B-5 was obtained as a pale yellow oily material (23 g) in the same manner as Synthesis Example 10, except that 2,6-dimethyl phenol in Synthesis Example 10 was changed to an equimolar 2,6-dibutyl phenol.

Synthesis Example 15

Synthesis of B-6

Exemplified compound B-6 was obtained as a pale yellow oily material (21 g) in the same manner as Synthesis Example 10, except that 2,6-dimethyl phenol in Synthesis Example 10 was changed to an equimolar 2,6-diethyl phenol.

Synthesis Example 16

Synthesis of B-7

Exemplified compound B-7 was obtained as a pale yellow oily material (15 g) in the same manner as Synthesis Example 10, except that 2,6-dimethyl phenol in Synthesis Example 10 was changed to an equimolar 2,3,6-trimethyl phenol.

Synthesis Example 17

Synthesis of B-8

Exemplified compound B-8 was obtained in the same manner as Synthesis Example 10, except that 2,6-dimethyl phenol in Synthesis Example 10 was changed to an equimolar 2,3,6-trimethyl phenol and 1,3-diisopropenylbenzene was changed to 1,3-bis(3-hydroxy-3-pentyl)benzene.

Synthesis Example 18

Synthesis of B-9

Exemplified compound B-9 was obtained as a yellow oily material (30 g) in the same manner as Synthesis Example 9, except that 1,4-diisopropenylbenzene was changed to an equimolar divinyl benzene.

Example 1

(1) Film Production of Cellulose Acylate Film
(Preparation of Cellulose Acylate)

Cellulose acylate having 2.87 of acetyl substitution degree was prepared. In this preparation, sulfuric acid (7.8 parts by mass with respect to 100 parts by mass of cellulose) was added as a catalyst, and a carboxylic acid used as a source of an acyl substituent was added, and the mixture was subjected to acylation reaction at 40° C. Further, after acylation, ripening was conducted at 40° C. Further, a low molecular component pert of the cellulose acylate was washed and removed with acetone.

(Preparation of Dope Liquid for Surface Layer at the Air Side)

Preparation of Cellulose Acylate Solution

The following composition was poured into a mixing tank, and each of components was dissolved by stirring to prepare a cellulose acylate solution.

| Composition of cellulose acylate solution | |
|---|---|
| Cellulose acetate having 2.87 of acetyl substitution degree and 370 of polymerization degree | 100.0 parts by mass |
| MONOPET (registered trademark) SB (plasticizer) manufactured by Dai-Ichi Kogyo Seiyaku Co., Ltd. | 9.0 parts by mass |
| SAIB-100 (plasticizer) manufactured by Eastman Chemical Company | 3.0 parts by mass |
| Exemplified compound A-1 | 4.0 parts by mass |
| Methyl chloride (first solvent) | 353.9 parts by mass |
| Methanol (second solvent) | 89.6 parts by mass |
| n-Butanol (third solvent) | 4.5 parts by mass |

It is noted that the MONOPET (registered trademark) SB manufactured by Dai-Ichi Kogyo Seiyaku Co., Ltd. is a benzoic acid sucrose ester, and the SAIB-100 manufactured by Eastman Chemical Company is an acetic acid/isobutyric acid sucrose ester.

Preparation of Matting Agent Solution

The following composition was poured into a dispersing machine, and each of components was dissolved by stirring to prepare a matting agent solution.

| Composition of matting agent solution | |
|---|---|
| Silica particles having an average particle size of 20 nm (AEROSIL R972, manufactured by Nippon Aerosil Co., Ltd) | 2.0 parts by mass |
| Methylene chloride (first solvent) | 69.3 parts by mass |
| Methanol (second solvent) | 17.5 parts by mass |
| n-Butanol (third solvent) | 0.9 parts by mass |
| The above-described cellulose acylate solution | 0.9 parts by mass |

1.3 parts by mass of the above-described matting agent solution and 98.7 parts by mass of the above-described cellulose acylate solution were mixed using an inline mixer to prepare a solution for surface layer at the air side.

(Preparation of Dope Liquid for Base Layer)

Preparation of Cellulose Acylate Solution

The following composition was poured into a mixing tank, and each of components was dissolved by stirring to prepare a dope liquid for base layer.

| Cellulose acetate having 2.87 of acetyl substitution degree and 370 of polymerization degree | 100.0 parts by mass |
|---|---|
| MONOPET (registered trademark) SB (plasticizer) manufactured by Dai-Ichi Kogyo Seiyaku Co., Ltd. | 9.0 parts by mass |
| SAIB-100 (plasticizer) manufactured by Eastman Chemical Company | 3.0 parts by mass |
| Exemplified compound A-1 | 4.0 parts by mass |
| Following ultraviolet absorber (UV-1) | 2.0 parts by mass |
| Methylene chloride (first solvent) | 297.7 parts by mass |
| Methanol (second solvent) | 75.4 parts by mass |
| n-Butanol (third solvent) | 3.8 parts by mass |

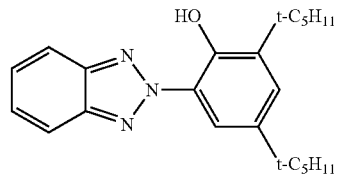

UV-1

(Preparation of Dope Liquid for Surface Layer at the Support Side)

1.3 parts by mass of the above-described matting agent solution which was prepared at the time of preparation of the above-described dope liquid for surface layer at the air side and 99.3 parts by mass of the same cellulose acylate solution as described above were mixed using an inline mixer to prepare a solution for surface layer at the support side.

(Casting)

The dope liquid for base layer prepared as the above and, at one side of both sides thereof, the dope liquid for surface layer at the air side and, at the other side, the dope liquid for surface layer at the support side were casted uniformly on a casting stainless support (support temperature: −9° C.) from a casting nozzle using a dram casting apparatus so that three layers of these dope liquids were casted at the same time. Then, the formed film was peel off from the support on the condition that the amount of a residual solvent in the dope of each layer was about 70% by mass, and then both ends of the film in the width direction were fixed with a pin tenter, and then the film was dried while stretching 1.28 times in the TD direction on the condition that the amount of a residual solvent was from 3 to 5% by mass. After that, the film was further dried by letting it transport between rolls of the heat treatment apparatus to obtain the cellulose acylate film of the present invention A101. The thickness of the obtained cellulose acylate film A101 was 60 μm, and the width thereof was 1480 mm.

The cellulose acylate films of the present invention A102 to A110 and Comparative cellulose acylate films Ac11 to Ac13 were produced respectively in the same manner as the cellulose acylate film A101, except that Exemplified compound A-1 in the cellulose acylate film A101 was changed to the compounds shown in Table 6 described below in an equimolar amount.

The cellulose acylate films of the present invention A201 and A202, and Comparative cellulose acylate film Ac21 were produced respectively in the same manner as the cellulose acylate films A101, A102 and Ac13, except that 12 parts by mass of the following polycondensation polymer (A) which was a polycondensation ester-based plasticizer was added in place of the MONOPET (registered trademark) SB and the SAIB-100 in the cellulose acylate films A101, A102 and Ac13.

Polycondensation polymer (A): polyester obtained from adipic acid and ethane diol (the end thereof is a hydroxyl group) (number-average molecular weight=1000)

With respect to each cellulose acylate film, evaluation of water-vapour transmission ratio, haze and yellowing of film were conducted. The obtained results are shown together in Table 6 described below.

Hereinafter, these cellulose acylate films are also referred to as a polarizing plate protective film.

[Evaluation]
(Evaluation of Water-vapour Transmission Ratio of Film)

The mass of water vapour that passes through the specimen cut out of the cellulose acylate film for 24 hours in the atmosphere of temperature of 40° C. and relative humidity of 90% RH was measured in accordance with the water-vapour transmission ratio test (cup method) of JIS Z0208, and the measured value was converted to a value of the film per m² of area. Thus, evaluation was conducted according to the following criterion.

AA: Water-vapour transmission ratio is less than 1100 g/m²·day.
A: Water-vapour transmission ratio is 1100 g/m²·day or more, and less than 1200 g/m²·day.
B: Water-vapour transmission ratio is 1200 g/m²·day or more, and less than 1300 g/m²·day
C: Water-vapour transmission ratio is 1300 g/m²·day or more (Evaluation of Thermal Coloration of Film)

The hue b° of each polarizing plate protective film before and after storage for 72 hours in the environment of 105° C. was measured using a spectrophotometer UV3150 manufactured by Shimadzu Corporation. Here, as the hue b° value increases in the negative direction, a blue color of the transmitted light increases, while as the hue b° value increases in the positive direction, a yellow color increases.

The results of this measurement were evaluated according to the following criterion.

AA: b° value is 0 or more, and less than 0.5.
A: b° value is 0.5 or more, and less than 0.8.
B: b° value is 0.8 or more, and less than 1.0.
C: b° value is 1.0 or more.

In Table 6 described below, the hue before heat storage was indicated as thermal coloration (Fr), the hue after heat storage was indicated as thermal coloration (3 day).

(Evaluation of Haze of Film)

Measurement was conducted using a haze meter (HGM-2DP, manufactured by Supg Test Instruments Co., Ltd.) in accordance with JIS K-7136. A specimen of 40 mm×80 mm was cut out of each polarizing plate protective film, and measurement of the specimen was conducted under the conditions of 25° C. and relative humidity 60% RH.

Further, after storage for 72 hours under the conditions of 105° C. and relative humidity 10% RH, haze measurement of the film was conducted under the same conditions as the above.

In Table 6 described below, the value of haze before storage was indicated as Fr, while the value of haze after storage as Aging.

The results of this measurement were evaluated according to the following criterion.

A: Haze value is 0% or more, and less than 1%.
B: Haze value is 1% or more, and less than 5%.
C: Haze value is 5% or more Example 2

(2) Preparation of Polarizing Plate
[Saponification Treatment of Polarizing Plate Protective Film]

The polarizing plate protective film A101 which is the cellulose acylate film produced in Example 1 was soaked in a 23 mol/L sodium hydroxide aqueous solution at 55° C. for 3 minutes. The film was then washed in a water-washing bath tank at room temperature and neutralized with 0.05 mol/L sulfuric acid at 30° C. The film was again washed in a water-washing bath tank at room temperature and further dried by warm air at 100° C. Thus, the saponified polarizing plate protective film A101 was obtained.

[Preparation of Polarizer]

A polyvinyl alcohol film with the thickness of 75 μm, which is composed of polyvinyl alcohol having an average polymerization degree of about 2400 and saponification degree of 99.9% by mole or greater, was soaked in pure water at 30° C., and then soaked at 30° C. in an aqueous solution having the composition of iodine/potassium iodide/water of 0.02/2/100 in terms of mass ratio. After that, it was soaked at 56.5° C. in an aqueous solution having the composition of potassium iodide/boric acid/water of 12/5/100 in terms of mass ratio. Continuously, it was rinsed with pure water at 8° C. and then dried at 65° C., thereby obtaining a polarizing film in which iodine was adsorbed and oriented on the polyvinyl alcohol film. Stretching was conducted primarily in the iodine staining and the boric acid process. The total draw ratio was 5.3.

[Sticking Together of Polarizer and Polarizing Plate Protective Film]

The polarizing plate protective film A101 having been subjected to a saponification treatment was stuck to one side of the polarizer produced as described above, with a polyvinyl alcohol-based adhesive.

A commercially-available cellulose triacetate film (FUJI-TAC TD80UF, manufactured by Fujifilm Corporation) was subjected to the same saponification treatment as described above. Together with a polyvinyl alcohol-based adhesive, the commercially-available cellulose triacetate film after the saponification treatment was stuck to the other side of the polarizer which is opposite to the side to which the produced polarizing plate protective film A101 has been stuck. Note that the commercially-available cellulose triacetate film has the film thickness of 80 μm and water-vapour transmission ratio of 400 g/m²*day.

At this time, the transmission axis of the polarizer and the slow axis of the polarizing plate protective film A101 having been subjected to a saponification treatment were disposed so that they were parallel to one another. Further, the transmission axis of the polarizer and the slow axis of the commercially-available cellulose triacetate film having been subjected to a saponification treatment were disposed so that they were perpendicular to one another.

Thus, the polarizing plate A101 of the present invention was produced.

Also with respect to each of the polarizing plate protective films of the present invention A102 to A110, A201, A202 and the polarizing plate protective films for comparison Ac11 to Ac13 and Ac21, the saponification treatment and the sticking together were conducted in the same manner as the above-described polarizing plate A101, whereby each of polarizing plates of the present invention A102 to A110, A201, A202 and polarizing plates for comparison Ac11 to Ac13 and Ac21 was produced.

With respect to each of the thus produced polarizing plates, evaluation of durability was conducted.

[Evaluation]
(Evaluation of Polarizer Durability of Polarizing Plate)

Each of the polarizing plates was evaluated as follows. The perpendicular transmittance CT of the polarizer at the wavelength of 410 nm was measured using an automatic polarizing film analyzer VAP-7070 (a product of JASCO Corporation). The average of 10 time-repeatedly measured values was used.

The polarizer durability test of polarizing plate was conducted as described below in the form in which each polarizing plate and a glass were stuck together via an adhesive so that the polarizing plate protective film of the present invention was disposed at the polarizing plate side opposite to the glass. Two samples (each about 5 cm×5 cm) of the polarizing plate stuck on the glass were prepared. In the measurement of single plate perpendicular transmittance, measurement is conducted by setting the film side of the sample toward a light source. Each of the two samples was measured, and the average of the thus-measured values was used as a perpendicular transmittance of the polarizing plate.

After that, the samples were stored for 336 hours under the environment of 80° C. and relative humidity 90% RH, and then the perpendicular transmittance was measured in the same manner as described above. A change of the perpendicular transmittance before and after aging was measured. By taking the change as the polarizer durability, evaluation was conducted in accordance with the following criteria.

It is noted that the relative humidity under the environment with no humidity conditioning was in the range of from 0 to 20% RH.
AA: less than 0.6%
A: from 0.6 to 1.0%
B: more than 1.0%, and 1.1% or less
C: more than 1.1%

The obtained results are shown together in the following Table 6.

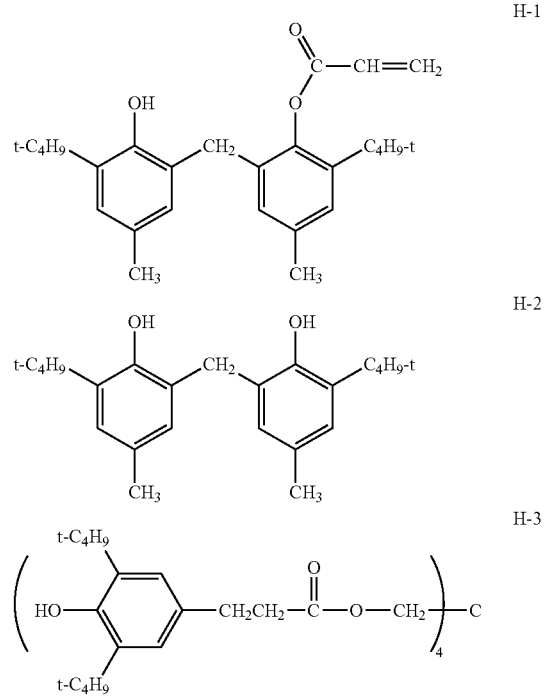

It is deduced from the above Table 6 that each of the polarizing plate protective films of the present invention is excellent in both suppression of thermal coloration and polarizer durability, as compared to the polarizing plate protective films Ac11 and Ac12. Further, it is understood that each of the polarizing plate protective films of the present invention is excellent in both suppression of haze and polarizer durability, as compared to the polarizing plate protective films Ac13 and Ac21. Further, it is understood that each of the polarizing plate protective films of the present invention exhibits a good effect of decreasing the water-vapour transmission ratio.

TABLE 6

| No. | Compound | Water-vapour transmission ratio ($g/m^2 \cdot day$) | Haze (%) Fr | Haze (%) Aging | Thermal coloration Fr | Thermal coloration 3 day | Polarizer durability | Remarks |
|---|---|---|---|---|---|---|---|---|
| A101 | A-1 | AA | AA | AA | AA | AA | AA | This invention |
| A102 | A-2 | AA | AA | AA | AA | A | AA | This invention |
| A103 | A-3 | A | A | A | A | A | A | This invention |
| A104 | A-4 | A | A | A | A | A | A | This invention |
| A105 | A-5 | A | A | A | A | A | A | This invention |
| A106 | A-6 | A | A | A | A | A | A | This invention |
| A107 | A-7 | A | A | A | A | A | A | This invention |
| A108 | A-8 | A | A | A | A | A | B | This invention |
| A109 | A-9 | A | A | A | A | A | B | This invention |
| A110 | A-19 | A | A | A | B | B | B | This invention |
| A201 | A-1 | AA | AA | AA | AA | AA | AA | This invention |
| A202 | A-2 | AA | AA | AA | AA | A | AA | This invention |
| Ac11 | H-1 | A | A | A | C | C | —(*) | Comparative example |
| Ac12 | H-2 | A | A | A | B | C | —(*) | Comparative example |
| Ac13 | H-3 | A | C | C | AA | AA | C | Comparative example |
| Ac21 | H-3 | A | C | C | AA | AA | C | Comparative example |

(*)Evaluation was impossible due to much coloration.

It is noted that comparative compound H-1 is SUMIRIZER GM manufactured by Sumitomo Chemical Co., Ltd., H-2 is SUMIRIZER MDP-S manufactured by Sumitomo Chemical Co., Ltd., and H-3 is IRGANOX 1010 manufactured by BASF, and they have the following structures.

Comparative example Ac11 to Ac21 which uses the known antioxidants H-1 to H-3 were inferior in polarizer durability of the polarizing plate, because of high degree of generation of either haze or thermal coloration, despite of low water-vapour transmission ratio.

Thus, by using the compound of the present invention, both haze and thermal coloration were reduced at the same time, and polarizer durability was enhanced and as a result, the problems which are difficult to address by known antioxidants were solved.

Example 3

(3) Preparation of Liquid Crystal Display

A viewer side polarizing plate of a commercially available liquid crystal display television (BRAVIA J5000 manufactured by Sony Corporation) was peeled off, and the polarizing plate A101 of the present invention produced in Example 2 which uses the polarizing plate protective film A101 produced in Example 1 was attached to the display television via an adhesive such that the polarizing plate protective film A101 was disposed on a liquid crystal cell side (film 31b in FIG. 1) to prepare the liquid crystal display A 301. Here, the transmission axis of the viewer side polarizing plate was vertically disposed. The configuration at the time is the same as the pattern diagram shown in FIG. 1. The liquid crystal display A 301 produced here has, in the order from the bottom of the drawing, light source 26, light guide plate 25, first polarizing plate 21A (polarizer 32, polarizing film 31a, 31b), array substrate 24 having an oriented film and a transparent electrode, liquid crystal layer 23, color filter substrate 22 having an oriented film and a transparent electrode, and polarizing plate 21B. In addition, as described above, polarizing plate protective film 31b of second polarizing plate 21B is also exchanged by the polarizing plate protective films of the present invention or comparative examples. At the time, the polarizing plate protective films and the polarizing plate were disposed such that the stretching direction of the polarizing plate protective film and the polarizing direction R of the polarizing plate coincided.

Further, the liquid crystal displays of the present invention A302 to A310, A401 and A402, and the liquid crystal displays for comparison Ac31 to Ac33 and Ac41 were prepared respectively in the same manner as the liquid crystal display A 301, except that the polarizing plate A101 was replaced with the polarizing plates A102 to A110, A201 and A202, Ac11 to Ac13 and Ac21.

After leaving each of the thus-prepared liquid crystal displays for 24 hours under the environment of 60° C. and relative humidity 90% RH, unevenness of the display was examined. As a result, it was found that any of the liquid crystal displays of the present invention was excellent in display performance because of non-occurrence of unevenness, or a smaller area of occurrence of unevenness, as compared to the liquid crystal displays of comparative examples which use the polarizing plate protective films of comparative examples.

Example 4

(1) Film production of cellulose acylate film

Cellulose acylate film B101 was produced in the same manner as the cellulose acylate film A101 produced in Example 1, except that Exemplified compound A-1 in the cellulose acylate film A101 produced in Example 1 was changed to Exemplified compound B-1 in an equivalent mass amount (4.0 parts by mass).

The cellulose acylate films of the present invention B102 to B109 and Comparative cellulose acylate films Bc11 to Bc13 were produced respectively in the same manner as the cellulose acylate film B101, except that Exemplified compound B-1 in the cellulose acylate film B101 was changed to the compounds shown in Table 7 described below in an equimolar amount.

The cellulose acylate films of the present invention B201, B202 and Comparative cellulose acylate films Bc21 were produced respectively in the same manner as the cellulose acylate films B101, B102 and Bc12, except that 12 parts by mass of the above-described polycondensation polymer (A) which is the polycondensation ester-based plasticizer used in Example 1 was added in place of MONOPET (registered trademark) SB and SAIB-100 in the cellulose acylate film B101, B102 and Bc12.

With respect to each cellulose acylate film, evaluation of water-vapour transmission ratio, haze and yellowing of film were conducted. The obtained results are shown together in Table 7 described below.

Hereinafter, these cellulose acylate films are also referred to as a polarizing plate protective film in the same manner as in Example 1.

[Evaluation]

(Evaluation of Water-vapour Transmission Ratio of Film)

Evaluation was conducted in the same manner and evaluation criteria as those in Example 1.

(Evaluation of Haze of Film)

Measurement was performed in the same manner as Example 1, except that the storage conditions in the measurement of haze after storage were changed to the storage for 24 hours under the conditions of 105° C. and relative humidity 10% RH, and evaluation was conducted according to the same criteria as Example 1.

In Table 7 described below, the value of haze before storage was indicated as Fr, while the value of haze after storage as Aging.

(Evaluation of Thermal Coloration and Photo-Induced Coloration of Film)

(i) Thermal Coloration

The hue b° of each polarizing plate protective film before and after storage for 24 hours in the environment of 105° C. was measured using a spectrophotometer UV3150 manufactured by Shimadzu Corporation.

Here, as the hue b° value increases in the negative direction, a blue color of the transmitted light increases, while on the other hand, as the hue b° value increases in the positive direction, a yellow color increases (ii) Photo-induced Coloration To each polarizing plate protective film, light irradiation was performed for 24 hours under the conditions of irradiance: 150 W/m$^2$, black panel temperature: 63° C. and relative humidity 50% RH using a super xenon weathermeter (SX75, manufactured by Suga Test Instruments Co., Ltd.). After that, the hue b° was measured using a spectrophotometer UV3150 manufactured by Shimadzu Corporation.

Based on the results of this measurement, both thermal coloration and photo-induced coloration were evaluated according to the following criteria.
AA: b° value is 0 or more, and less than 0.2.
A: b° value is 0.2 or more, and less than 0.4.
B: b° value is 0.4 or more, and less than 0.5.
C: b° value is 0.5 or more.

In Table 7 described below, in the thermal coloration and the photo-induced coloration, the hue before heat storage or before light irradiation was indicated respectively as thermal coloration (Fr), while the hue after heat storage as thermal coloration (24 hr) as well as the hue after light irradiation as photo-induced coloration (24 hr).

Example 5

(2) Preparation of Polarizing Plate
The polarizing plate of the present invention B101 to B109, B201 and B202 of the present invention and the comparative polarizing plate Bc11 to Bc13 and Bc21 were prepared respectively in the same manner as the polarizing plate A101 prepared in Example 2, except that the polarizing plate protective film A101 used in the polarizing plate prepared in Example 2 was replaced with the polarizing plate protective film B101 to B109, B201 and B202 of the present invention and the comparative polarizing plate protective film Bc11 to Bc13 and Bc21.

With respect to each of the thus produced polarizing plates, evaluation of durability was conducted.
[Evaluation]
(Evaluation of Polarizer Durability of Polarizing Plate)
A change of the perpendicular transmittance before and after aging was measured in the same manner and the same storage conditions as those in Example 2. By taking the change as the polarizer durability, evaluation was conducted in accordance with the following criteria.
AA: less than 0.6%
A: from 0.6 to 1.0%
B: more than 1.0%, and 2.0% or less
C: more than 2.0%

The obtained results are shown together in the following Table 7.

It is noted that comparative compound H-3 is p-cumylphenol, manufactured by Tokyo Chemical Industry Co., Ltd., H-4 is IRGANOX 1330 manufactured by BASF, and H-5 is p-cumylphenol, manufactured by Tokyo Chemical Industry Co., Ltd. and they have the following structures.

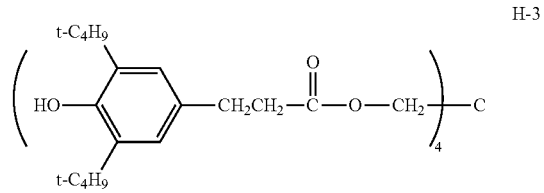

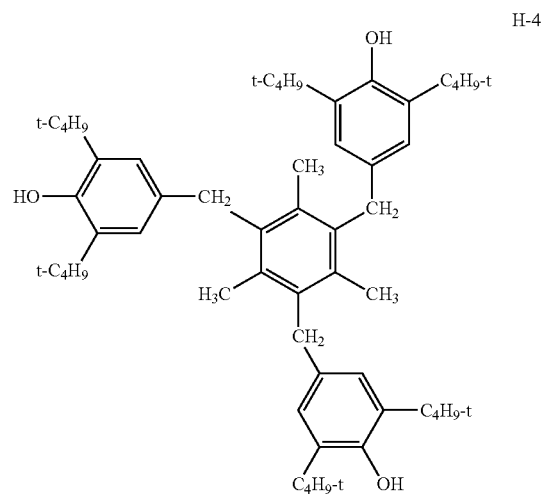

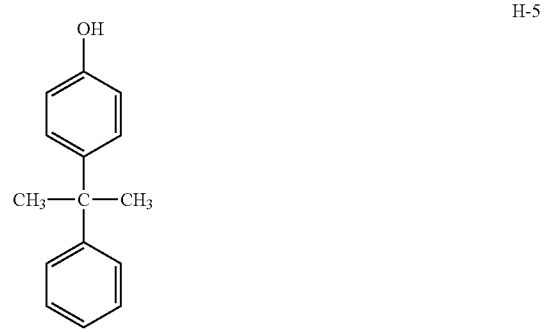

TABLE 7

| No. | Compound | Water-vapour transmission ratio (g/m²·day) | Haze (%) Fr | Haze (%) Aging | Thermal coloration Fr | Thermal coloration 24 hr | Photo-induced coloration 24 hr | Polarizer durability | Remarks |
|---|---|---|---|---|---|---|---|---|---|
| B101 | B-1 | AA | A | A | A | A | AA | AA | This invention |
| B102 | B-2 | AA | A | A | A | A | AA | AA | This invention |
| B103 | B-3 | AA | A | A | A | A | A | A | This invention |
| B104 | B-4 | AA | A | A | A | A | A | A | This invention |
| B105 | B-5 | AA | A | A | A | A | A | A | This invention |
| B106 | B-6 | AA | A | A | A | A | A | A | This invention |
| B107 | B-7 | AA | A | B | A | A | A | B | This invention |
| B108 | B-8 | AA | A | B | A | A | A | B | This invention |
| B109 | B-9 | AA | A | A | B | B | A | A | This invention |
| B202 | B-2 | AA | A | A | A | A | AA | AA | This invention |
| B201 | B-1 | AA | A | A | A | A | AA | AA | This invention |
| Bc11 | H-4 | AA | C | C | A | A | A | C | Comparative example |
| Bc12 | H-3 | A | C | C | A | A | C | B | Comparative example |
| Bc13 | H-5 | A | A | A | A | A | A | C | Comparative example |
| Bc21 | H-3 | A | C | A | A | A | C | B | Comparative example |

It is deduced from the above Table 7 that each of the polarizing plate protective films of the present invention has a low water-vapour transmission ratio, and further as compared to the known antioxidants, each of the polarizing plate protective films of the present invention is improved in terms of less occurrence of haze, and suppression of both thermal coloration and photo-induced yellowing, and enhanced polarizer durability.

In the case of the known antioxidants, the degree of generation of either haze or photo-induced yellowing was high, despite of low water-vapour transmission ratio. Further, in the comparative compounds H-4 and H-5, polarizer durability was also inferior.

Thus, by using the compound of the present invention, haze and thermal coloration and photo-induced yellowing were reduced at the same time, and polarizer durability was enhanced and as a result, the problems which are difficult to address by known antioxidants were solved.

Example 6

(3) Preparation of Liquid Crystal Display

The liquid crystal displays of the present invention B301 to B309, B401 and B402, and the liquid crystal displays for comparison Bc31 to Bc33 and Bc41 were prepared respectively in the same manner as the liquid crystal display A301 prepared in Example 3, except that the polarizing plate A101 used in the liquid crystal display A301 prepared in Example 3 was replaced with the polarizing plates B101 to B109, B201 and B202, Bc11 to Bc13 and Bc21.

After leaving each of the thus-prepared liquid crystal displays for 24 hours under the environment of 60° C. and relative humidity 90% RH, unevenness of the display was examined. As a result, it was found that any of the liquid crystal displays of the present invention is excellent in display performance because of non-occurrence of unevenness, or a smaller area of occurrence of unevenness, as compared to the comparative liquid crystal displays which uses the polarizing plate protective films for comparison.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2012-210215 filed in Japan on Sep. 24, 2012 and No. 2012-210216 filed in Japan on Sep. 24, 2012, which are entirely herein incorporated by reference.

REFERENCE SIGNS LIST

1 Dope for two surface layers
2 Dope for core layer
3 Co-casting Giesser
4 Casting support
21A, 21B Polarizing plate
22 Color filter substrate
23 Liquid crystal layer
24 Army substrate
25 Light guide plate
26 Light source
31a, 31b Cellulose acylate film (Polarizing plate protective film)
32 Polarizer

What is claimed is:

1. A cellulose acylate film comprising a compound represented by the following Formula (II) and cellulose acylate:

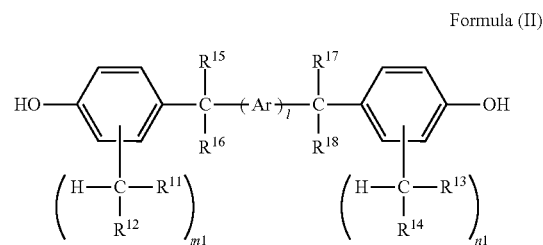

Formula (II)

wherein in Formula (II), $R^{11}$ to $R^{14}$ each independently represent a hydrogen atom, or an alkyl group having 1 to 8 carbon atoms; $R^{11}$ and $R^{12}$, and/or, $R^{13}$ and $R^{14}$ may bond to one another to form a ring; $R^{15}$ and $R^{17}$ each independently represent an unsubstituted alkyl group having 1 to 8 carbon atoms; and $R^{16}$ and $R^{18}$ each independently represent a hydrogen atom, or an unsubstituted alkyl group having 1 to 8 carbon atoms; Ar represents a substituted or unsubstituted arylene group having 6 to 18 carbon atoms; l, m1 and n1 independently represent an integer of 1 to 4.

2. The cellulose acylate film according to claim 1, wherein the $R^{16}$ and $R^{18}$ each independently represent a hydrogen atom, or an unsubstituted alkyl group having 1 to 8 carbon atoms.

3. The cellulose acylate film according to claim 1, wherein the compound represented by the Formula (II) is a compound represented by the following Formula (IIA):

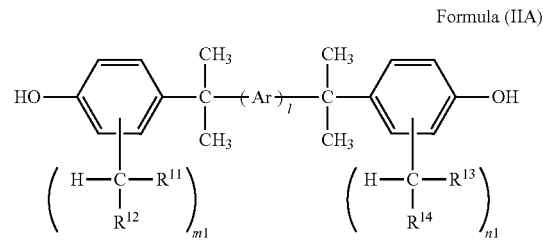

Formula (IIA)

wherein in Formula (IIA), $R^{11}$ to $R^{14}$, Ar, l, m1 and n1 are the same meanings as those of $R^{11}$ to $R^{14}$, Ar, l, m1 and n1 in the Formula (II), respectively.

4. The cellulose acylate film according to claim 3, wherein the compound represented by the Formula (IIA) is a compound represented by the following Formula (IIB):

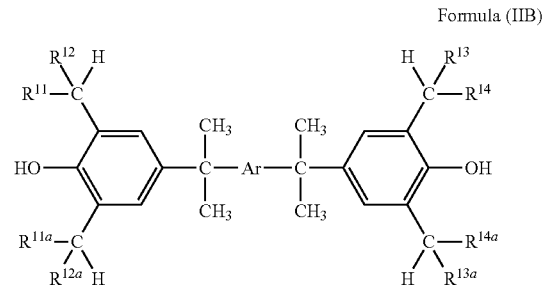

Formula (IIB)

wherein in Formula (BB), $R^{11}$ to $R^{14}$ and Ar are the same meanings as those of $R^{11}$ to $R^{14}$ and Ar in the Formula (II), respectively; $R^{11a}$ to $R^{14a}$ are the same meanings as those of the $R^{11}$ to $R^{14}$, respectively.

5. The cellulose acylate film according to claim 4, wherein the $R^{11}$ and $R^{12}$ simultaneously represent a hydrogen atom or simultaneously represent an alkyl group having 1 to 6 carbon atoms; the $R^{13}$ and $R^{14}$ simultaneously represent a hydrogen atom or simultaneously represent an alkyl group having 1 to 6 carbon atoms; the $R^{11a}$ and $R^{12a}$ simultaneously represent a hydrogen atom or simultaneously represent an alkyl group having 1 to 6 carbon atoms; and the $R^{13a}$ and $R^{14a}$ simultaneously represent a hydrogen atom or simultaneously represent an alkyl group having 1 to 6 carbon atoms.

6. The cellulose acylate film according to claim 4, wherein the compound represented by the Formula (IIB) is a compound represented by the following Formula (IC):

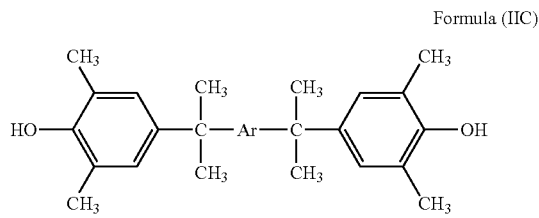

Formula (IIC)

wherein in Formula (IIC), Ar is the same meaning as that of Ar in the Formula (II).

7. The cellulose acylate film according to claim 1, wherein the acyl substitution degree (A) of the cellulose acylate satisfies the following formula:

$1.5 \leq A \leq 3.0$.

8. The cellulose acylate film according to claim 1, wherein an acyl group of the cellulose acylate is an acetyl group, and the acetyl substitution degree (B) of the cellulose acylate satisfies the following formula:

$2.0 < B < 3.0$.

9. The cellulose acylate film according to claim 1, further comprising at least one polycondensation ester compound.

10. The cellulose acylate film according to claim 9, wherein the polycondensation ester compound is obtained by polycondensation of at least one dicarboxylic acid represented by the following Formula (a) and at least one diol represented by the following Formula (b):

Formula (a)

Formula (b)

in Formulae (a) and (b), X represents a divalent aliphatic group having 2 to 18 carbon atoms or a divalent aromatic group having 6 to 18 carbon atoms, and Z represents a divalent aliphatic group having 2 to 8 carbon atoms.

11. The cellulose acylate film according to claim 9, wherein the number-average molecular weight of the polycondensation ester compound is from 500 to 2000.

12. The cellulose acylate film according to claim 9, wherein the terminal of the polycondensation ester compound is sealed.

13. The cellulose acylate film according to claim 1, further comprising at least one compound selected from a monosaccharide and a carbohydrate compound composed of from 2 to 10 monosaccharide units.

14. The cellulose acylate film according to claim 13, wherein the carbohydrate compound has an alkyl group, an aryl group or an acyl group.

15. The cellulose acylate film according to claim 13, wherein the carbohydrate compound has an acyl group.

16. A polarizing plate comprising at least the cellulose acylate film according to claim 1 and a polarizer.

17. A liquid crystal display comprising at least the polarizing plate according to claim 16 and a liquid crystal cell.

18. A method of improving polarizer durability of a polarizing plate comprising a polarizer and a cellulose acylate film provided on one side or both sides of the polarizer, by utilizing the cellulose acylate film described in claim 1 as said cellulose acylate film.

* * * * *